(12) United States Patent
Robertson

(10) Patent No.: US 7,575,286 B2
(45) Date of Patent: Aug. 18, 2009

(54) ELECTRIC TRAILER BRAKE CONTROLLER

(75) Inventor: Charles L. Robertson, Horton, AL (US)

(73) Assignee: Syncro Corporation, Arab, AL (US)

( * ) Notice: Subject to any disclaimer, the term of this patent is extended or adjusted under 35 U.S.C. 154(b) by 96 days.

(21) Appl. No.: 10/962,163

(22) Filed: Oct. 8, 2004

(65) Prior Publication Data
US 2005/0077780 A1    Apr. 14, 2005

Related U.S. Application Data

(60) Provisional application No. 60/509,974, filed on Oct. 9, 2003.

(51) Int. Cl.
*B60T 7/20* (2006.01)
*B60T 13/00* (2006.01)

(52) U.S. Cl. .................... 303/123; 303/191; 303/20

(58) Field of Classification Search .................. 303/7, 303/9.61, 13, 123, 124, 128, 20, 191, 199; 188/3 R, 3 H, 112 R, 112 H, 112 A; 701/78
See application file for complete search history.

(56) References Cited

U.S. PATENT DOCUMENTS

| | | | |
|---|---|---|---|
| 3,566,987 A * | 3/1971 | Franzel | 188/112 A |
| 3,738,710 A | 6/1973 | Pokrinchak et al. | |
| 3,771,840 A | 11/1973 | Hubbard | |
| 3,780,832 A | 12/1973 | Marshall | |
| 3,819,234 A | 6/1974 | Couchois et al. | |
| 4,084,859 A | 4/1978 | Bull et al. | |
| 4,398,252 A | 8/1983 | Frait | |
| 4,524,312 A | 6/1985 | Matsumoto et al. | |
| 4,721,344 A | 1/1988 | Frait et al. | |
| 4,726,627 A | 2/1988 | Frait et al. | |
| 4,733,540 A * | 3/1988 | Sakurai | 62/133 |
| 4,856,850 A | 8/1989 | Aichele et al. | |
| 5,050,937 A * | 9/1991 | Eccleston | 303/7 |
| 5,149,176 A | 9/1992 | Eccleston | |
| 5,352,028 A | 10/1994 | Eccleston | |
| 5,615,930 A | 4/1997 | McGrath et al. | |
| 5,620,236 A | 4/1997 | McGrath et al. | |
| 5,741,048 A | 4/1998 | Eccleston | |
| 5,782,542 A | 7/1998 | McGrath et al. | |
| 5,785,393 A | 7/1998 | McGrath et al. | 303/7 |
| 5,800,025 A | 9/1998 | McGrath et al. | |
| 5,949,147 A | 9/1999 | McGrath et al. | |
| 6,012,780 A | 1/2000 | Duvernay | |
| 6,039,410 A | 3/2000 | Robertson et al. | |
| 6,068,352 A | 5/2000 | Kulkarni et al. | 303/20 |
| 6,151,543 A * | 11/2000 | McKee et al. | 701/55 |
| 6,179,390 B1 * | 1/2001 | Guzorek et al. | 303/7 |

(Continued)

FOREIGN PATENT DOCUMENTS

JP    62137221 A  *  6/1987

*Primary Examiner*—Melody M Burch
(74) *Attorney, Agent, or Firm*—MacMillan, Sobanski & Todd, LLC

(57) ABSTRACT

A trailer brake controller comprising a brake control signal generator, a microprocessor connected to the brake control signal generator, at least one pushbutton connected to the microprocessor, and a programmable current sensing power switch with temperature protection which is operative to change to a non-conducting state upon a current feed back signal exceeding a predetermined current shut down threshold and also upon the temperature of the switch exceeding a temperature shut down threshold.

8 Claims, 39 Drawing Sheets

U.S. PATENT DOCUMENTS

| | | |
|---|---|---|
| 6,325,466 B1 * | 12/2001 | Robertson et al. ............. 303/20 |
| 6,367,588 B1 | 4/2002 | Robertson et al. ....... 188/1.11 E |
| 6,445,993 B1 | 9/2002 | Eccleston et al. |
| 6,532,419 B1 | 3/2003 | Begin et al. |
| 6,557,952 B1 | 5/2003 | Robertson et al. ........... 303/124 |
| 6,607,253 B1 * | 8/2003 | Yamamoto et al. .......... 303/112 |
| 6,615,125 B2 | 9/2003 | Eccleston et al. |
| 6,619,759 B2 * | 9/2003 | Bradsen et al. ................ 303/7 |
| 6,655,752 B2 | 12/2003 | Robertson et al. ............. 303/20 |
| 6,837,551 B2 | 1/2005 | Robinson et al. ............... 303/7 |
| 6,845,851 B1 | 1/2005 | Donaldson et al. |
| D515,483 S * | 2/2006 | Culbert ...................... D12/180 |

* cited by examiner

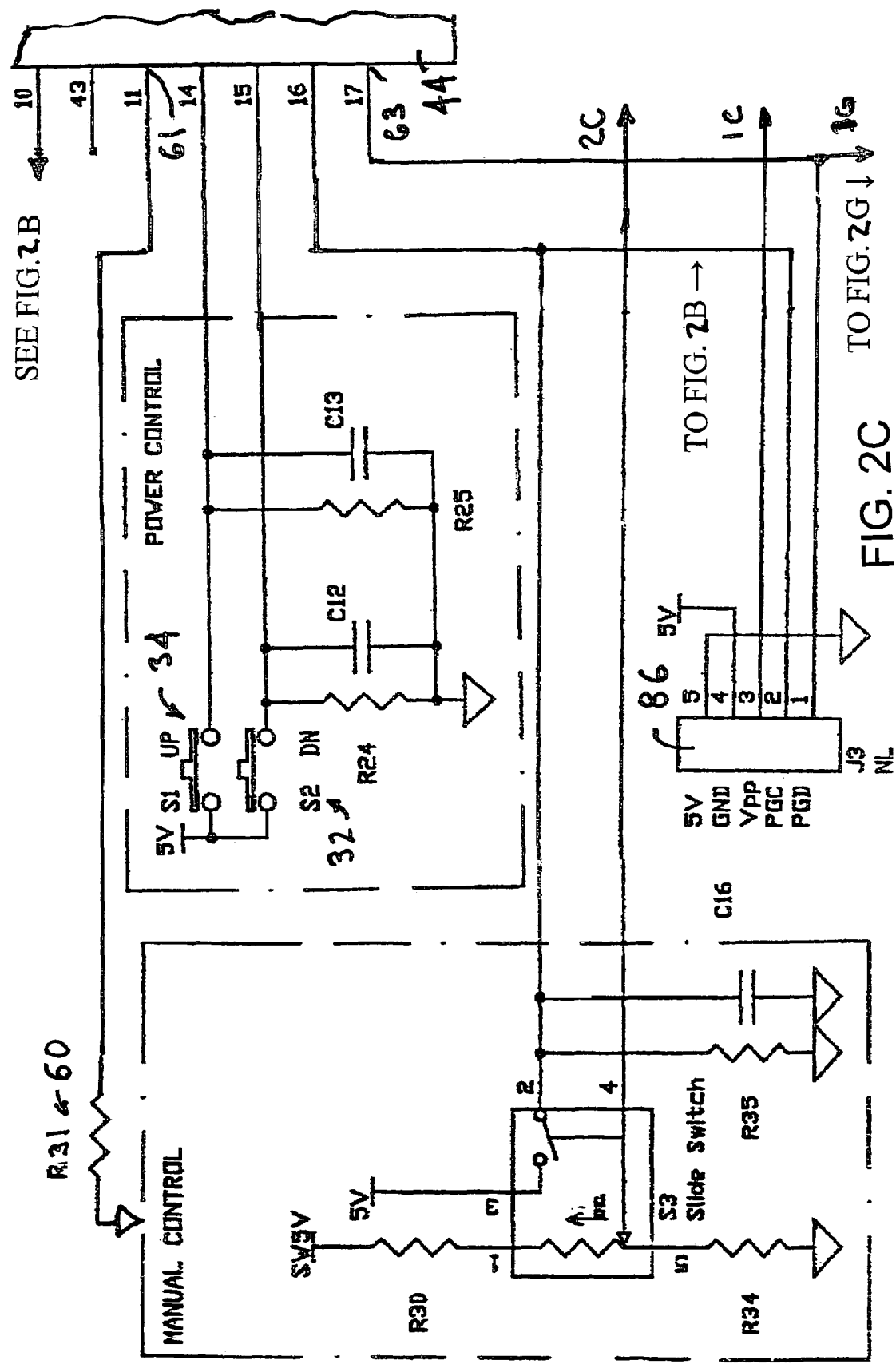

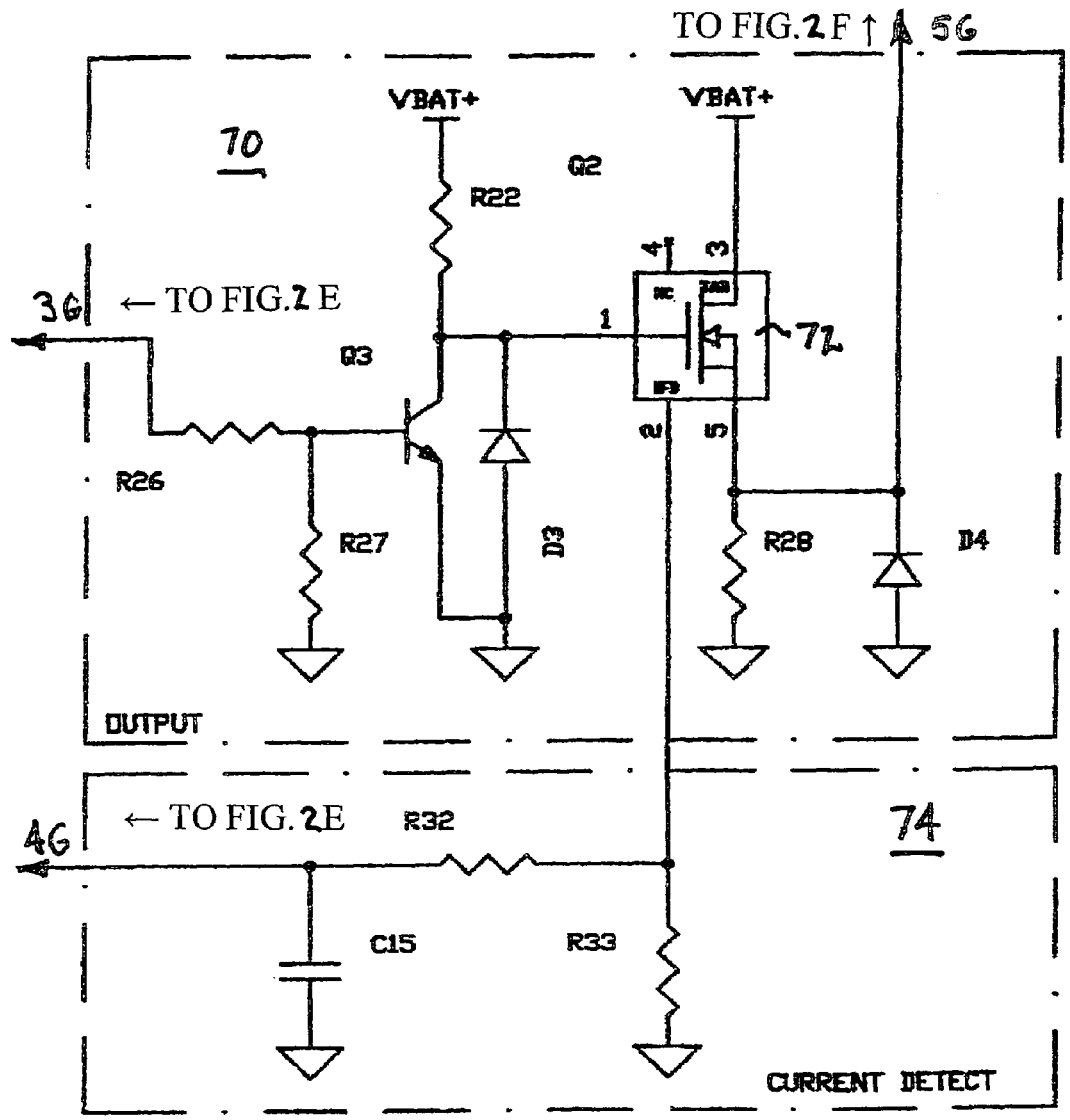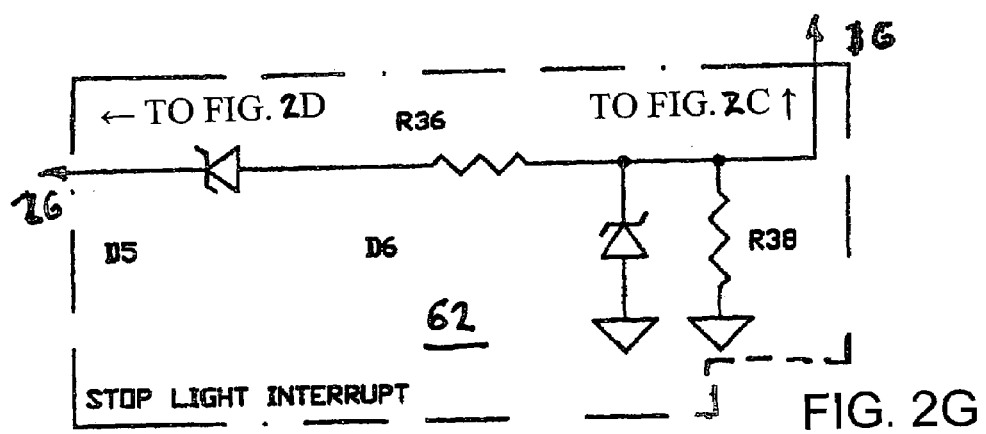
FIG. 2G

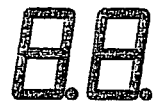 Displayed at power up to check all segments

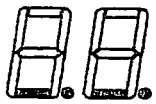 Level - Used at the factory only

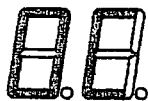 Open Connection, trailer not connected

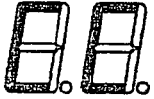 Calibration Complete, Used at factory only

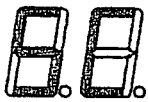 Short Circuit, output is shorted to ground.

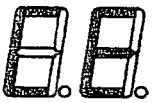 Calibration Error, Used at factory only

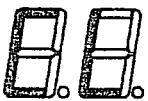 Current Limit, current is higher than rating

 100% Test Complete, Used at factory only

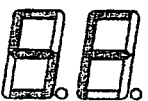 Slide Fault, Slide SW is on all the time

 Error - Both cal. & test jumpers are on

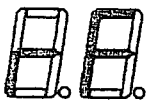 Remote Fault, remote circuit fault

 Display off or controller asleep

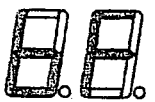 Blue Fault, blue wire is hot and output is off

 Percent Power display mode 

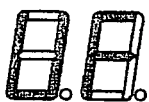 Up (+) Fault, Up button stuck on

 Voltage display mode 

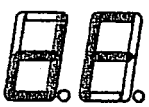 Down (-) Fault, "-" button stuck on

 Current Display mode (Amps) 

 Hazard Flashers on

FIG. 7

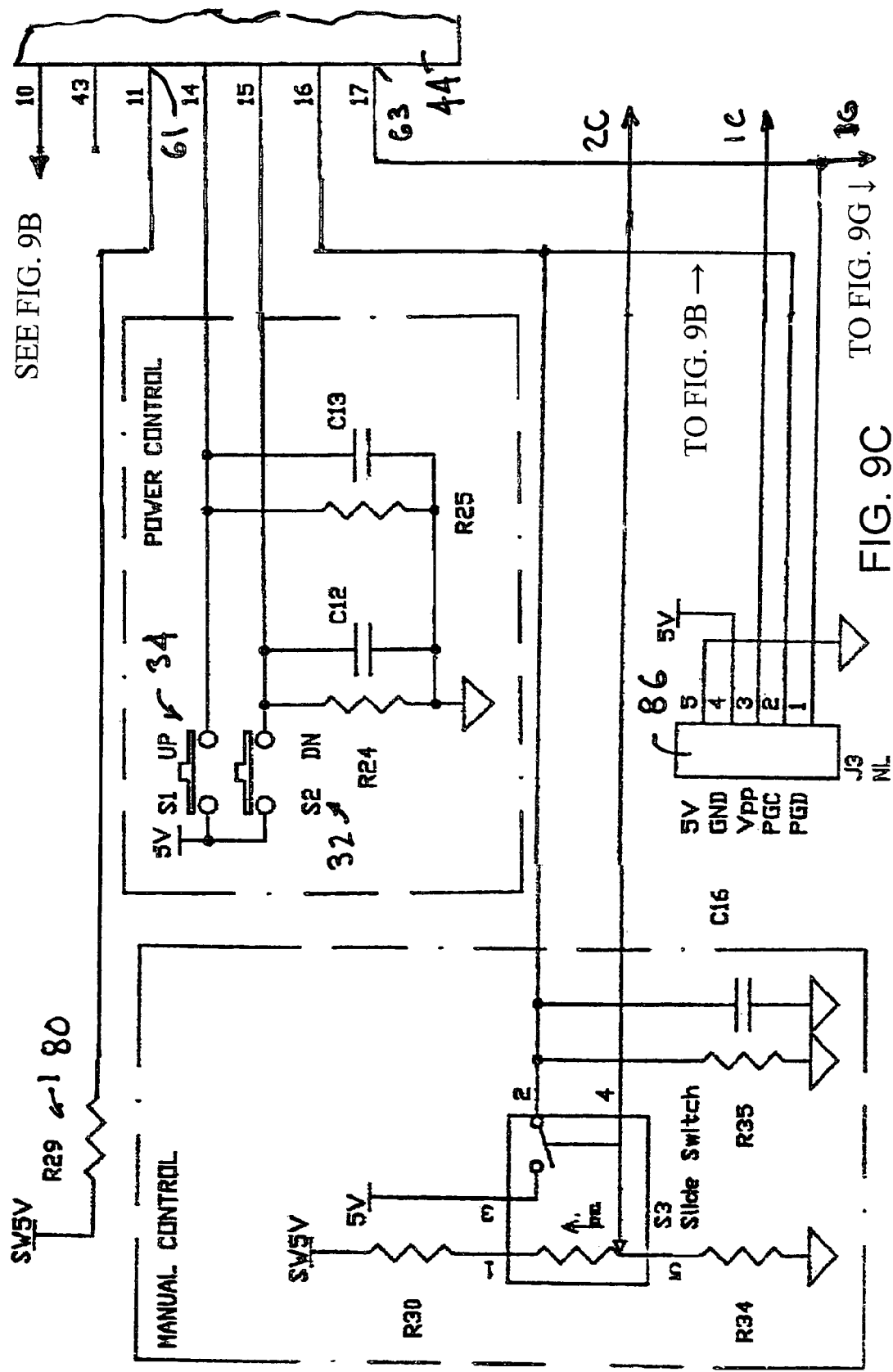

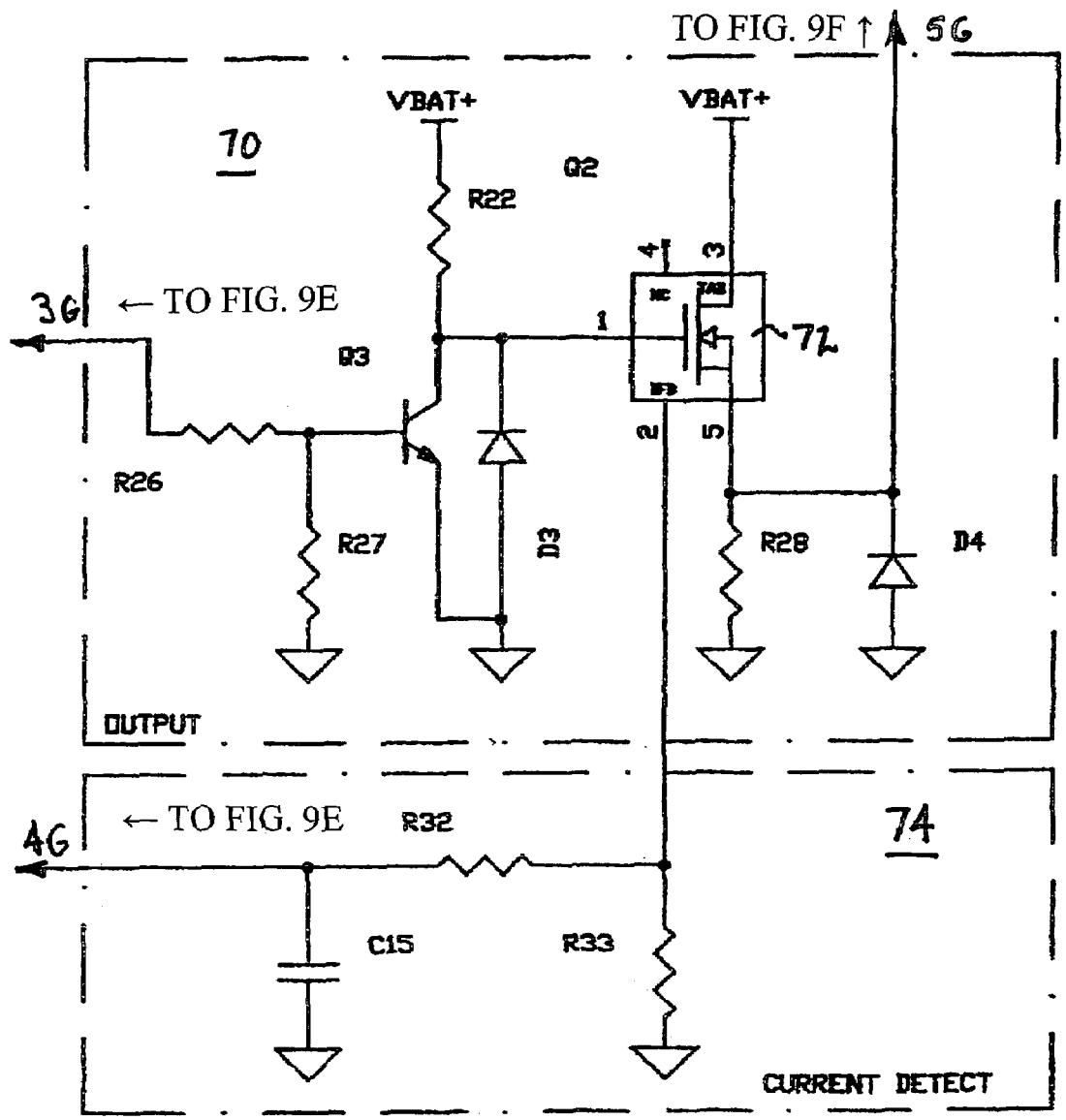
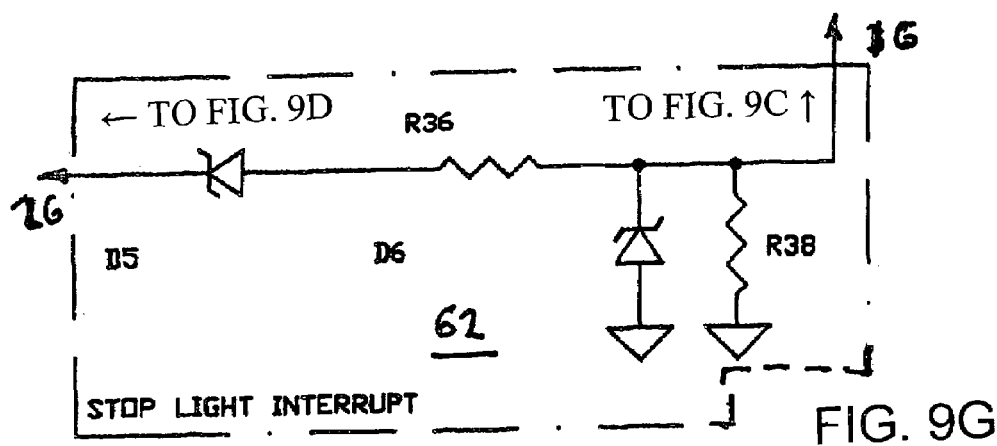
FIG. 9G

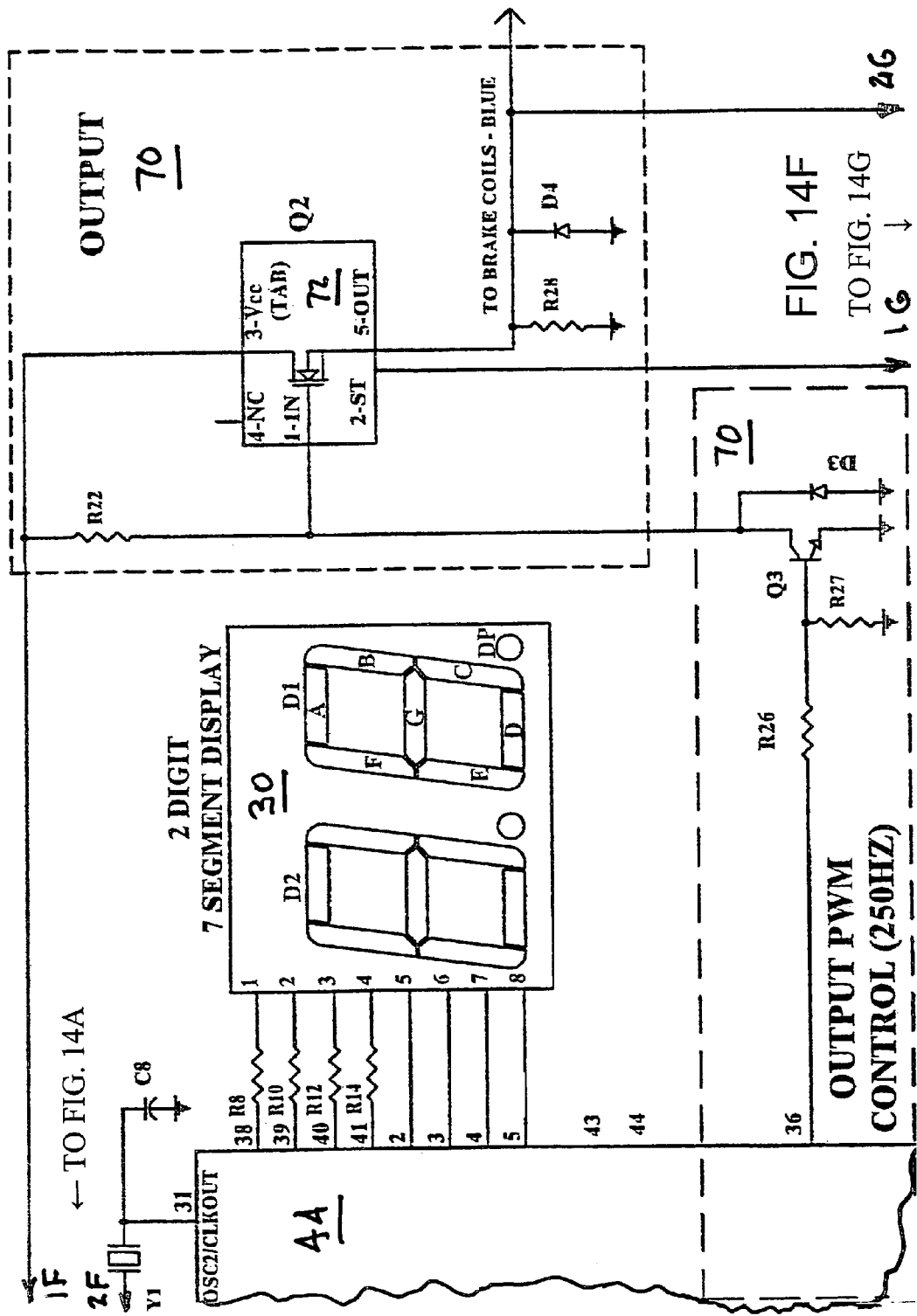

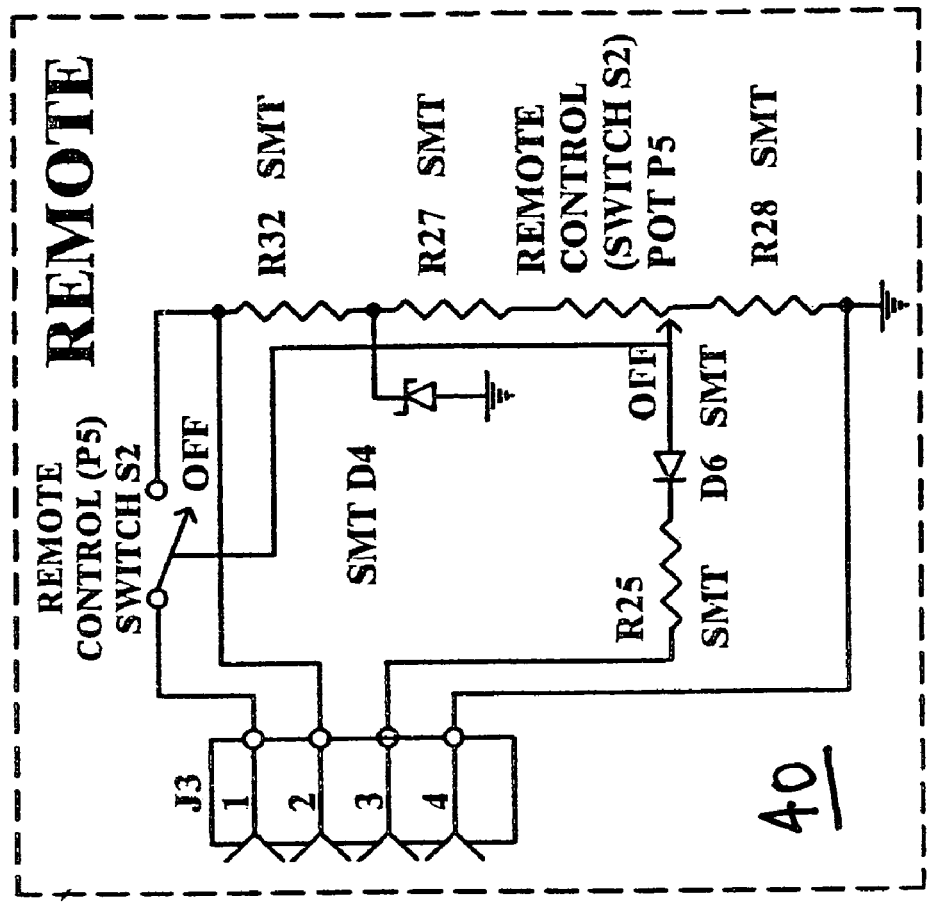
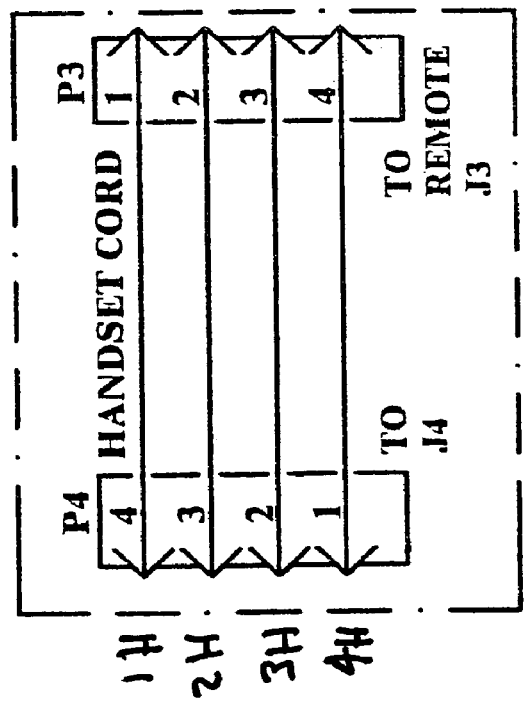
FIG. 14H

ELECTRIC TRAILER BRAKE CONTROLLER

CROSS REFERENCE TO RELATED APPLICATIONS

This application claims the benefit of U.S. Provisional Application No. 60/509,974, filed Oct. 9, 2003, the disclosure of which is incorporated herein by reference.

BACKGROUND OF INVENTION

This invention relates in general to controllers for electric wheel brakes used on trailers and in particular to an improved controller for such electric wheel brake controllers.

Towed vehicles, such as recreational and utility trailers that are towed by automobiles and small trucks, are commonly provided with electric wheel brakes. The electric wheel brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric wheel brakes on a two wheeled trailer can draw six amperes of current when actuated and the electric wheel brakes on a four wheeled trailer can draw 12 amperes of current.

Automotive industry standards require that electrically-actuated vehicle wheel brakes be driven against the ground potential of the vehicle power supply. Accordingly, one end of each of the towed vehicle wheel brake electromagnets is electrically connected to the towed vehicle ground and the towed vehicle ground is electrically connected to the towing vehicle ground. The other end of each of the wheel brake electromagnets is electrically connected through an electric wheel brake controller to the towing vehicle power supply.

Various electric brake controllers for towed vehicle electric brakes are known in the art. For example, a variable resistor, such as a rheostat, can be connected between the towing vehicle power supply and the brake electromagnets. Such an actuator is disclosed in U.S. Pat. No. 3,740,691. The towing vehicle operator manually adjusts the variable resistor setting to vary the amount of current supplied to the brake electromagnets and thereby control the amount of braking force developed by the towed vehicle wheel brakes.

It also is known to include an integrating circuit in an electric wheel brake controller. When the towing vehicle brakes are applied, a signal is sent to the integrating circuit. The integrating circuit generates a continually increasing voltage which is applied to the electric wheel brakes. The longer the towing vehicle brakes are applied, the more brake torque is generated by the actuator. A manually adjustable resistor typically controls the rate of integration. One such actuator is disclosed in U.S. Pat. No. 3,738,710.

Also known in the art are more sophisticated electric wheel brake controllers which include electronic circuitry to automatically supply current to the towed vehicle brake electromagnets that is proportional to the towing vehicle deceleration when the towing vehicle brakes are applied. Such electronic wheel brake controllers typically include a sensing unit that automatically generates a brake control signal corresponding to the desired braking effort. For example, the sensing unit can include a pendulum which is displaced from a rest position when the towing vehicle decelerates and an electronic circuit which generates a brake control signal that is proportional to the amount of pendulum displacement. One such unit is disclosed in U.S. Pat. No. 4,721,344. Alternately, the hydraulic pressure in the towing vehicle's braking system or the pressure applied by the vehicle operator's foot to the towing vehicle's brake pedal can be sensed to generate the brake control signal. An example of a controller which senses the towing vehicle brake pressure to generate the brake control signal is disclosed in U.S. Pat. No. 4,398,252.

Known electronic wheel brake controllers also usually include an analog pulse width modulator. The input of the pulse width modulator is electrically connected to the sensing unit and receives the brake control signal therefrom. The pulse width modulator is responsive to the brake control signal to generate an output signal comprising a fixed frequency pulse train. The pulse width modulator varies the duty cycle of the pulse train in direct proportion to the magnitude of the brake control signal. Thus, the duty cycle of the pulse train corresponds to the amount of braking effort desired.

Electronic wheel brake controllers further include an output stage which is electrically connected to the output of the pulse width modulator. The output stage typically has one or more power transistors which are connected between the towing vehicle power supply and the towed vehicle brake electromagnets. The power transistors, which are usually Field Effect Transistors (FET's), function as an electronic switch for supplying electric current to the towed vehicle brakes. The output stage may also include a driver circuit which electrically couples the output of the pulse width modulator to the gates of the FET's.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

It is also known to include an manual override control with electronic wheel brake controllers. Such manual override controls typically include a potentiometer that is actuated by a sliding control lever or pushbutton that is moved by the vehicle driver. The potentiometer provides a manual brake control signal to the input of the analog pulse width modulator. The controllers are usually designed to discriminate between the manual brake control signal and the brake control signal supplied by the sensing unit and to respond to the greater signal.

SUMMARY

The present invention relates to an improved controller for electric wheel brakes of towed vehicles.

As described above, rather sophisticated known controllers for electric trailer brakes have been developed. However, know controllers tend to be non-linear devices and usually operate within operating parameter limits preset by the manufacturer. Accordingly, it would be desirable to provide linear operation and a capability for the user to adjust operating parameters limits along with adding further innovative features to brake controllers.

The present invention contemplates a trailer brake controller that includes a brake control signal generator for generating a brake control signal that is a function of time and increases from an initial minimum value to a maximum value. The controller also includes a microprocessor connected to the brake control signal generator and responsive to the brake control signal to generate an output brake actuation signal that is related to the brake control signal. The controller further includes at least one pushbutton connected to the microprocessor that is operative to change selected operating parameters of the microprocessor.

The invention also contemplates that the controller includes a pair of pushbuttons that are selectively operative to select a maximum brake controller output and a time period for increasing the brake control output from a minimum to the maximum value.

Alternately, the brake signal generator may generate a brake control signal that is a function of the deceleration of a towing vehicle. The invention contemplates using either a pendulum device or a two axis accelerometer to generate the brake control signal. The brake controller output is limited by minimum and maximum values. Accordingly, the invention also contemplates that the controller includes a pair of pushbuttons that are selectively operative to select the minimum and maximum brake controller output values.

The invention further contemplates that the microprocessor includes an internal ROM that stores the coding for an algorithm that is utilized to operate the controller. The controller further includes an EEPROM that is connected to the microprocessor and stores any operating parameters selected by manipulation of the pushbuttons.

The invention also contemplates that the controller includes a programmable current sensing power switch that is adapted to be connected between a power supply and a set of trailer brake coils. The power switch is connected to an output pin of the microprocessor and responsive to the brake control signal to supply a current that is a function of the brake control signal to the trailer brake coils. The power switch is also connected to a current feedback port of the microprocessor and the microprocessor is operative to monitor the current being supplied to the trailer brake coils. The microprocessor is further operative, upon the brake coil current exceeding a predetermined threshold, to cause the power switch to change to a non-conducting state for a predetermined period of time. The controller also includes a digital display connected to the microprocessor. The microprocessor is operative to monitor parameters within the trailer brake circuit and, upon detection of a problem, to illuminate the display to inform the towing vehicle operator of the problem.

Various objects and advantages of this invention will become apparent to those skilled in the art from the following detailed description of the preferred embodiment, when read in light of the accompanying drawings.

BRIEF DESCRIPTION OF DRAWINGS

FIGS. 2A through 2J illustrate a circuit diagram for the brake controller shown in FIG. 1.

FIG. 7 illustrates the visual display codes available for the controller shown in FIG. 1.

FIGS. 9A through 9J illustrate a circuit diagram for the brake controller shown in FIG. 8.

FIGS. 14A through 14H illustrate a circuit diagram for the brake controller shown in FIG. 13.

DETAILED DESCRIPTION

Figure 1:
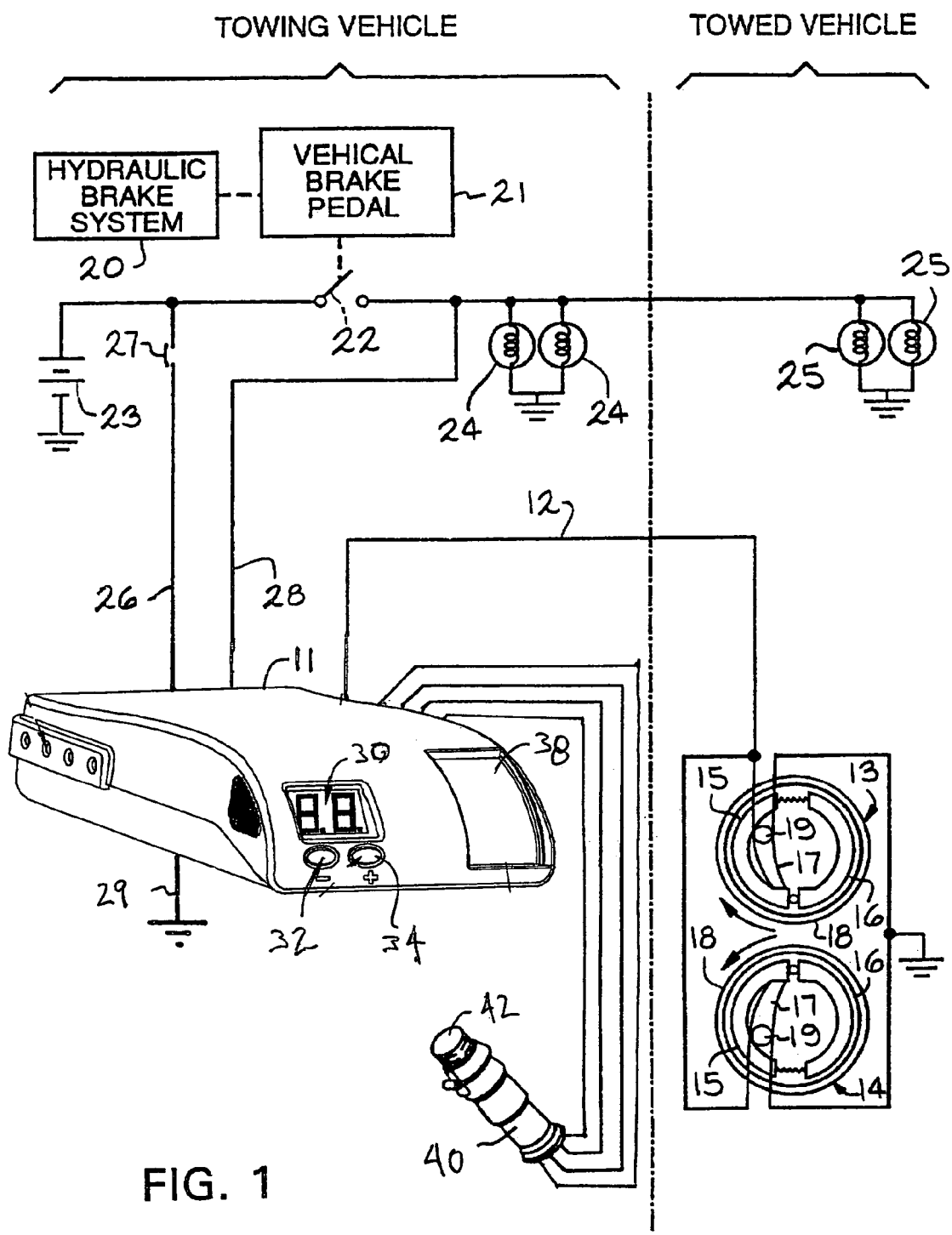
FIG. 1 is a schematic circuit drawing of a brake controller that is in accordance with the present invention.
Figure 2A:
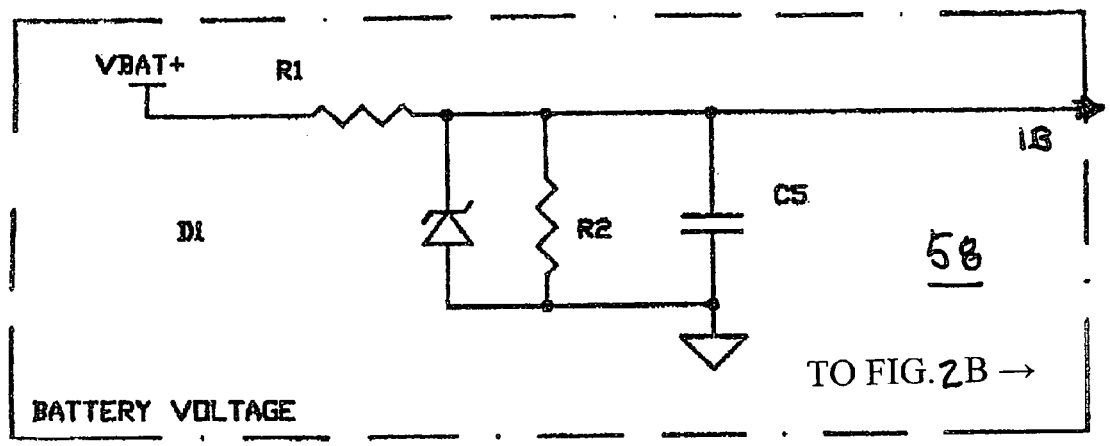
Figure 2B:
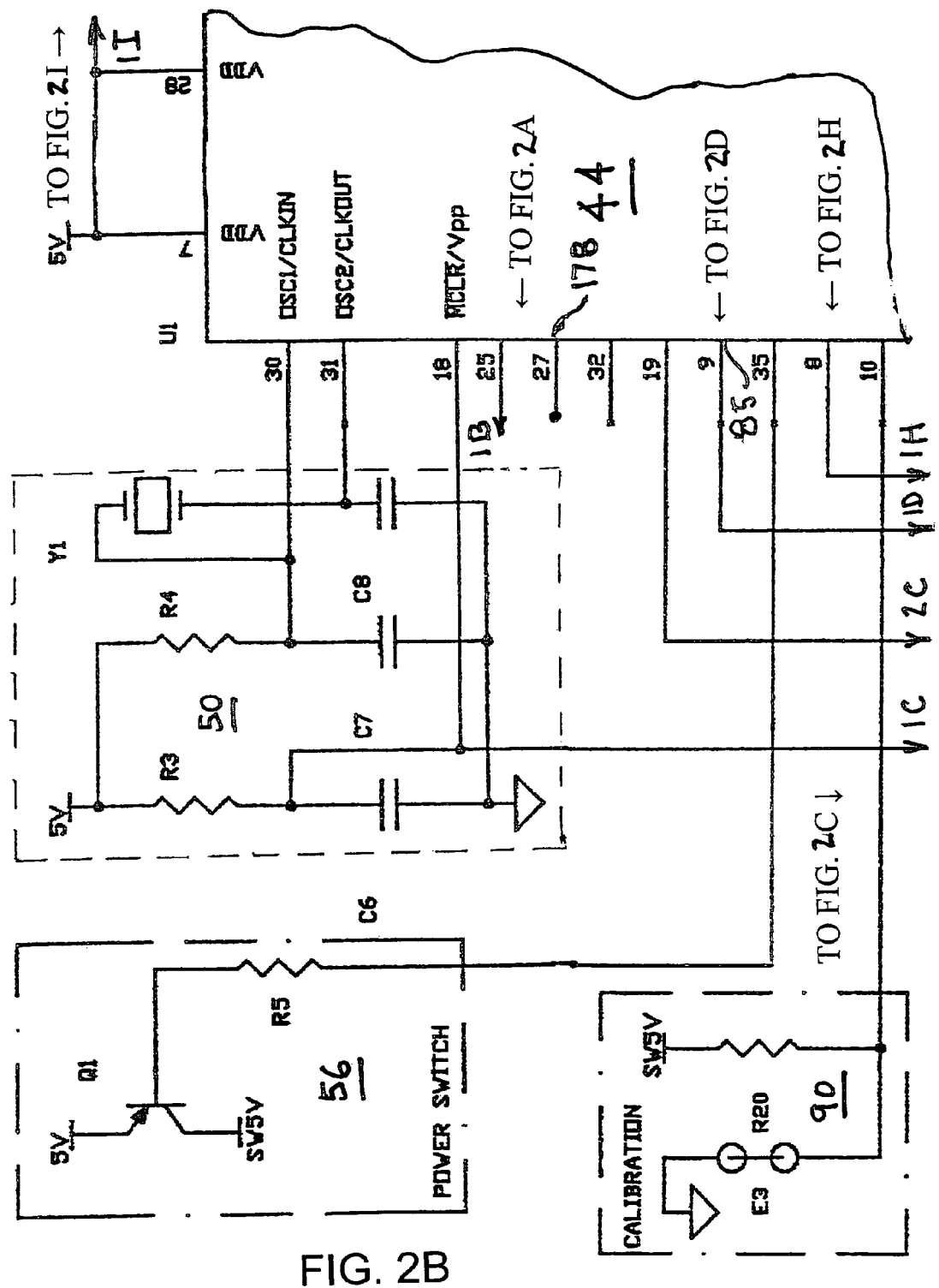
Figure 2D:
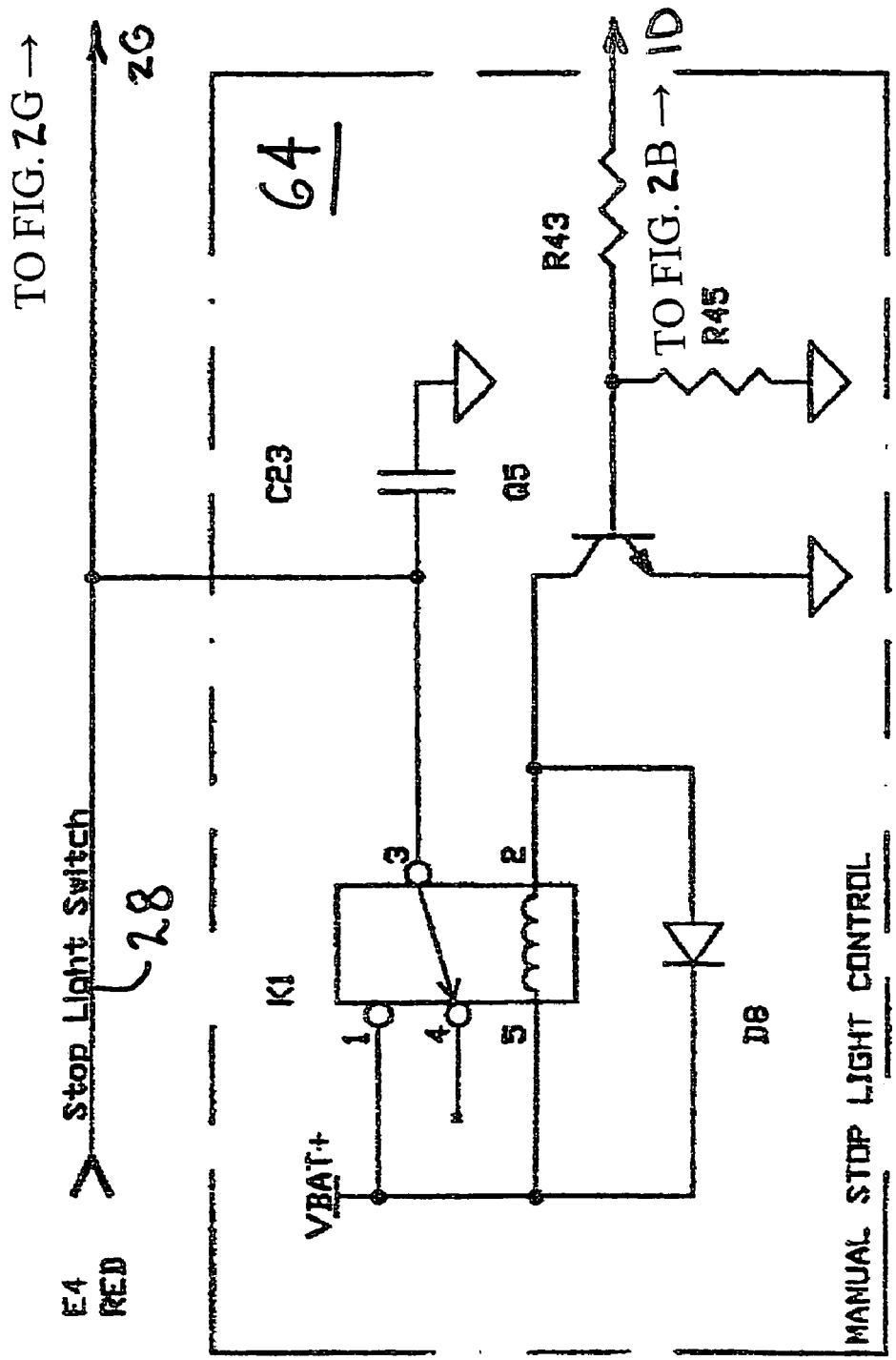
Figure 2E:
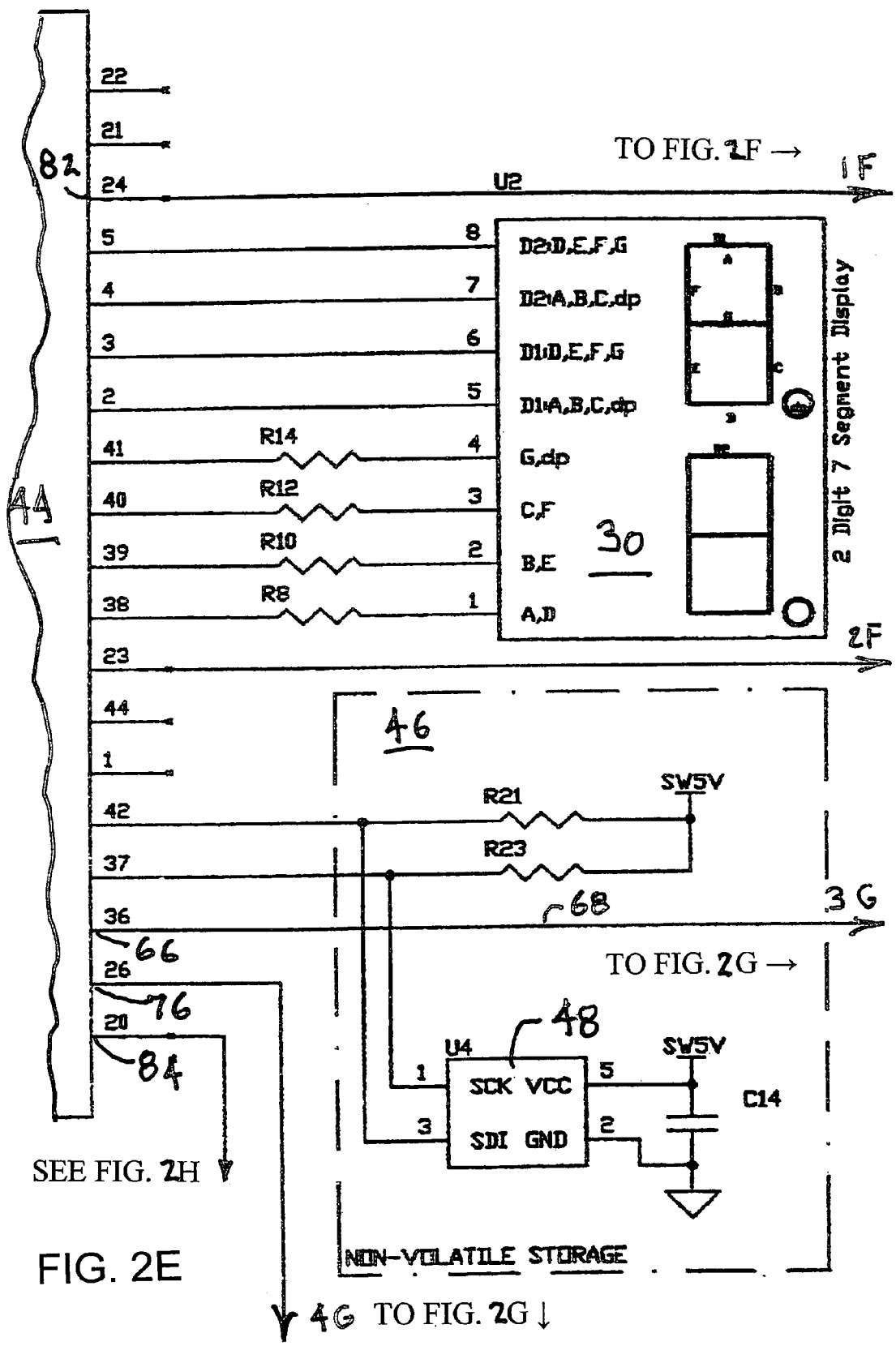
Figure 2F:
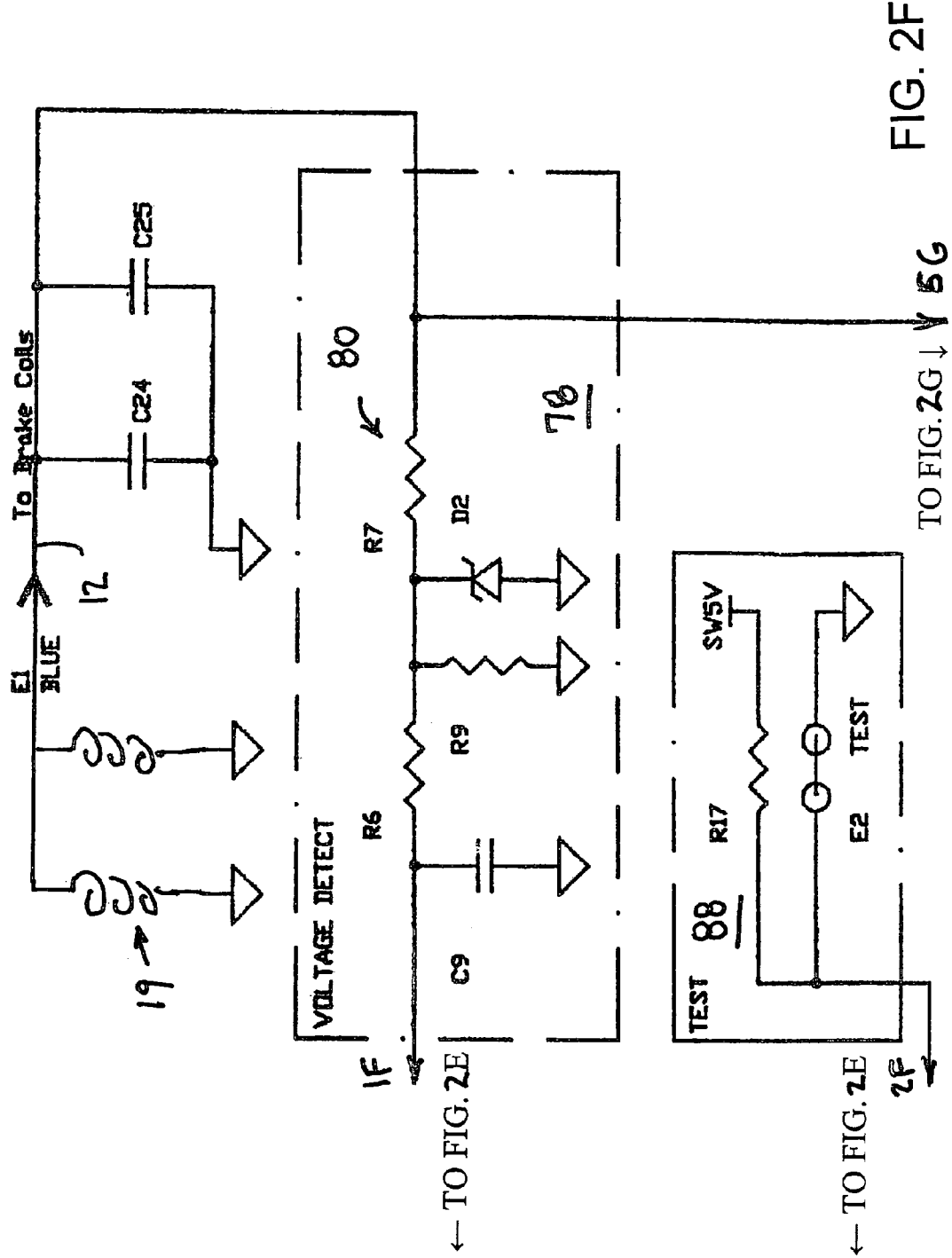
Figure 2H:
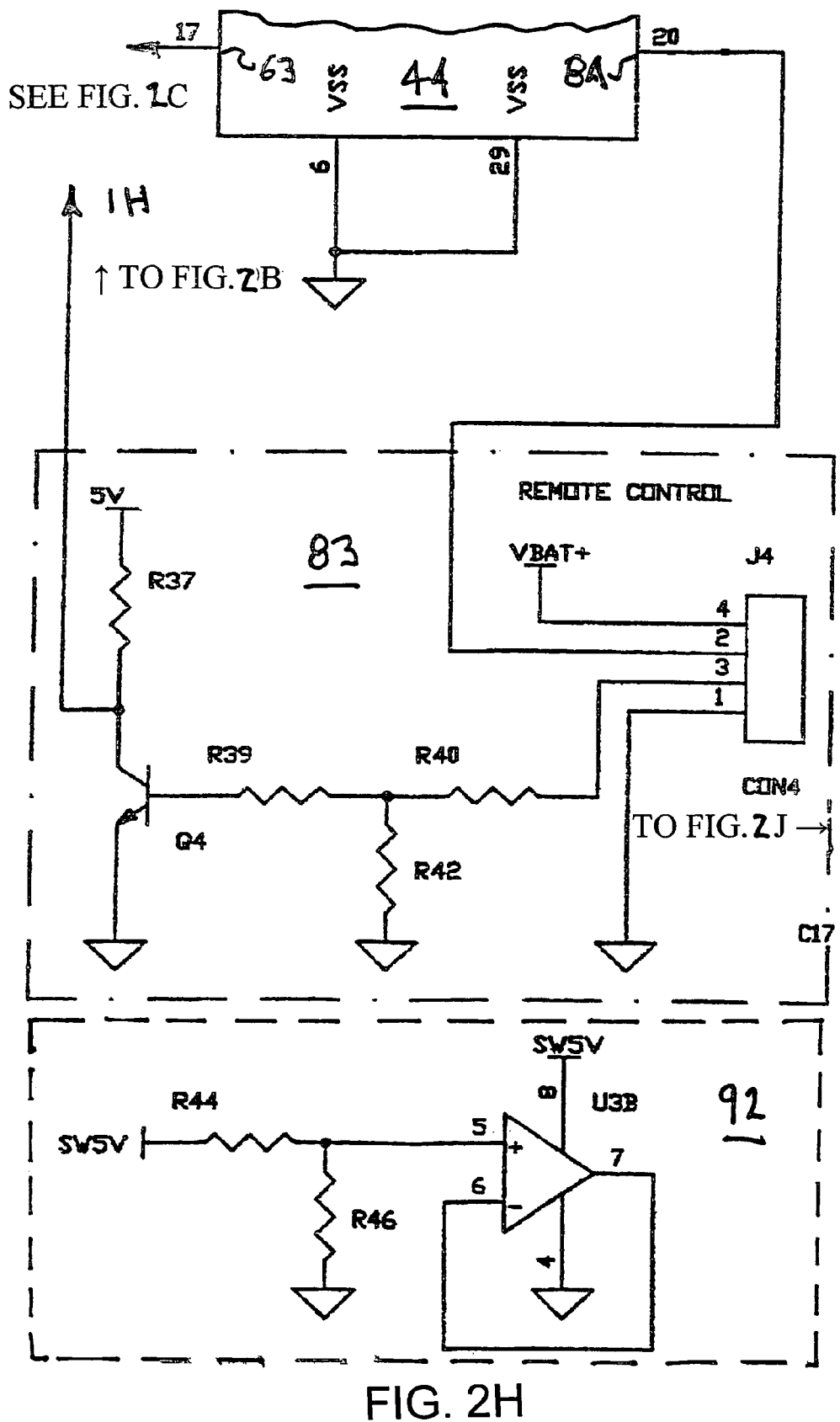
Figure 2I:
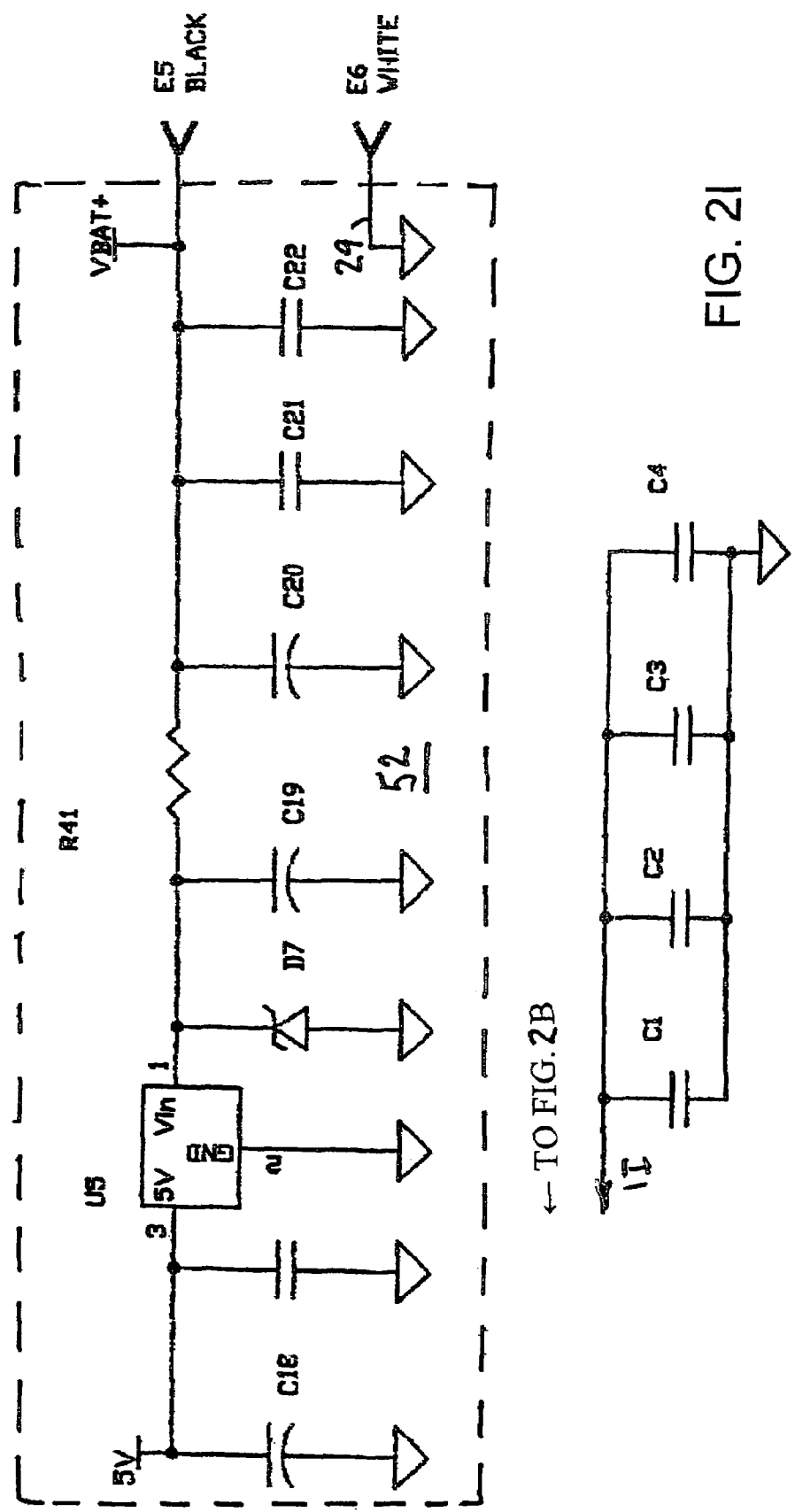
Figure 2J:
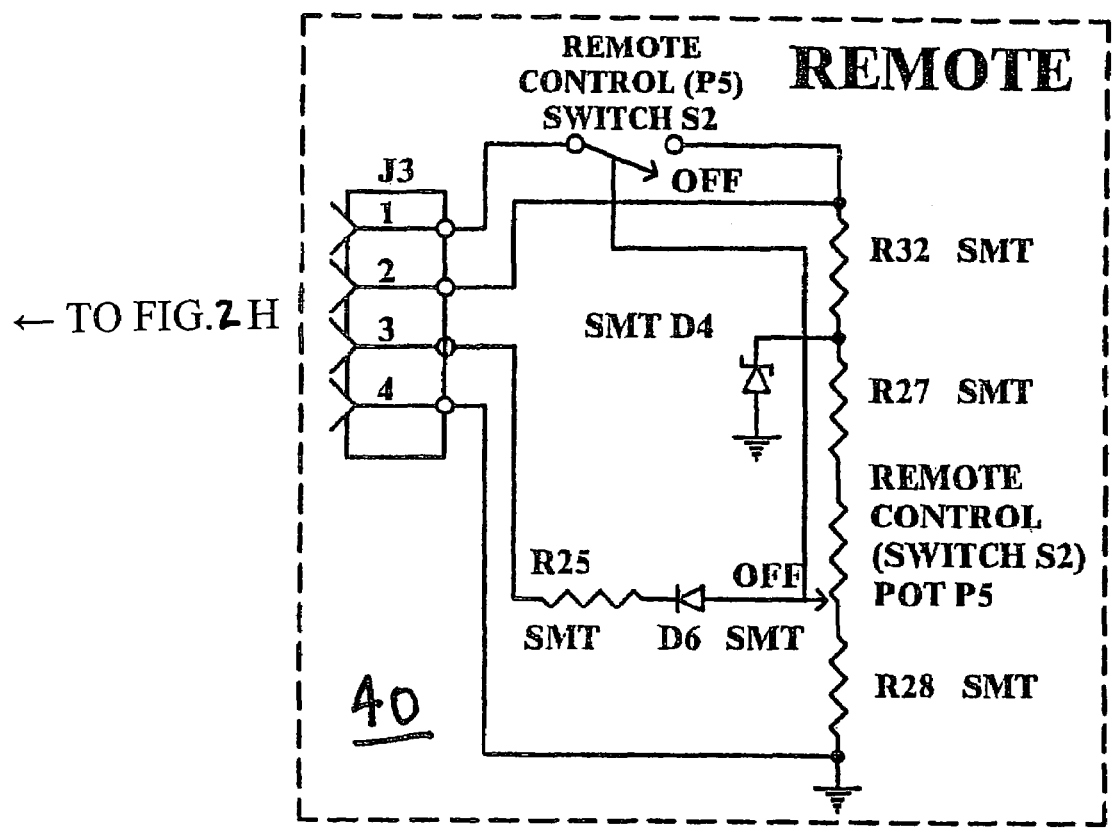

Referring now to the drawings, there is shown in FIG. 1 a schematic diagram illustrating an electric brake system for a towed vehicle (not shown), shown generally at 10, which utilizes an electronic brake controller 11 embodying the principles of the present invention. The brake controller 11 is typically located in a towing vehicle (not shown), usually being mounted beneath the towing vehicle dashboard. When actuated, the controller 11 functions to supply an electric current through a first line 12 to energize electric brakes 13 and 14 which brake the wheels of the towed vehicle (not shown).

The electric brakes 13 and 14 each include a pair of brake shoes 15 and 16 which, when actuated by a lever 17, are expanded into contact with a brake drum 18 for braking the wheels of the towed vehicle. A separate electromagnet 19 is mounted on an end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner. It will be appreciated that, while FIG. 1 shows two sets of brakes 13 and 14, the invention also can be applied to towed vehicles having more than two sets of brakes.

The towing vehicle typically includes a conventional hydraulic brake system 20 which is actuated when a brake pedal 21 is depressed by a vehicle driver. The brake pedal 21 is coupled to a brake light switch 22. When the brake pedal 21 is depressed, the switch 22 is closed and power from a vehicle power supply 23, shown as a storage battery in FIG. 1, is supplied to one or more towing vehicle brake lights 24 and one or more towed vehicle brake lights 25. The vehicle power supply 23 is also connected by a second line 26 through a circuit breaker 27 to the controller 11. Power is continuously supplied to the controller 11 through the second line 26. It will be appreciated that, while a circuit breaker 27 is shown in FIG. 1, a fuse or other over-current protection device can be used. A third line 28 connects the brake light side of the brake light switch 22 to the controller 11. Thus, power also is supplied through the third line 28 to the controller 11 when the brake light switch 22 is closed. The controller is connected to the towing vehicle ground by a fourth line 29.

The controller 11 further includes a two digit seven segment digital display 30 and a pair of setup/adjustment pushbuttons 32 and 34 mounted upon the front surface of the controller housing. The digital display 30 provides visual feedback concerning operation of the controller 11 to the towing vehicle driver, as will be described below. The pushbuttons 32 and 34 permit adjustment of the controller 11 operation by the driver, as also will be described below.

The brake controller 11 shown in FIG. 1 is a time based controller that operates with a time based circuit 36 shown in FIG. 2. The controller 11 is activated upon closure of the brake light switch 22 when the towing vehicle brake pedal 21 is depressed. Upon activation, the controller 11 supplies an initial current to the towed vehicle brakes 13 and 14. The electric current to the brakes is then continuously increased, or "ramped up", to a preset maximum value while the brake pedal 21 remains depressed. Upon release of the brake pedal 21, the electric current through line 12 is interrupted and the towed vehicle brakes 13 and 14 are released.

In some instances, it may be desirable to actuate only the towed vehicle brakes 13 and 14. This may be desirable, for example, to stabilize the towed vehicle against oscillations or swinging caused by strong side winds. Therefore, the brake controller 11 also includes a manual mode of operation. Accordingly, a manual slide lever 38 is provided on the electronic controller 11 to allow the vehicle driver to actuate the towed vehicle brakes 13 and 14 without applying the towing vehicle brakes. Moving the manual slide lever 38 to the left in FIG. 1 initiates the manual mode of operation. The amount of electric current supplied to the towed vehicle brakes 13 and 14 is proportional to the displacement of the manual slide lever 38. If the manual slide lever 38 is moved while the brake pedal 21 is depressed, the manual operating mode overrides the automatic operating mode.

The controller 11 may also be provided with an optional hand held manual remote switch 40. The manual remote control 40 includes a pushbutton 42 which can be used to initiate the manual mode of operation. Upon pressing the pushbutton 42, the manual remote control 40 functions the same as the manual switch 38 to actuate the towed vehicle brakes with the applied braking force being proportional to the displacement of the pushbutton 42. The remote manual control 40 is described in U.S. Pat. No. 6,557,952, which is incorporated herein by reference. When either the manual slide lever 38 or the manual remote control 40 are pressed, the towing vehicle and towed vehicle brake lights 24 and 25 are illuminated.

Referring now to FIGS. 2A through 2J, the controller circuit 36 includes a Micro-Processor Unit (MPU) 44 that is programmed to generate a brake control signal upon closure of the brake light switch 22. In the preferred embodiment, the MPU 44 is a PIC16F7X CMOS FLASH-base 8-bit microcontroller supplied by Microchip Technology Inc.; however, the invention also may be practiced with other similar microprocessors. The MPU 44 includes an internal Read Only Memory (ROM) that permanently stores coding for a controller operating algorithm within the unit. The algorithm provides the instructions for the controller operation during a brake application. The MPU 44 is connected to an external memory 46 that includes an Electrically Erasable Programmable Read Only Memory EEPROM 48. The EEPROM 48 stores operational settings for the controller 11 as provided by the manufacturer or input by the driver by means of the pushbuttons 32 and 34. The EEPRO 48 retains the stored information during power interruptions, such as would occur when the battery is disconnected during servicing of the towing vehicle. The MPU 44 is also connected to a conventional oscillator circuit 50 that sets the clock rate for the operation of the unit.

A conventional voltage regulator circuit 52 is connected between the vehicle power supply 23 and the MPU 44. The voltage regulator circuit 52 provides a constant five volts to MPU 44 and other components in the circuit 36. Additionally, a tap 53 at the input to the regulator circuit 52 provides battery voltage VBAT+ directly to selected components of the controller circuit 36, as shown in FIG. 2. A plurality of capacitors 54 connected in parallel between the voltage input port of the MPU 44 and ground provide EMI and RMI suppression for the controller voltage supply.

The controller circuit 36 also includes a sleep mode, or standby, circuit 56 connected between the regulator circuit 52 and other selected circuits. The controller 11 goes to sleep in 5 minutes if the MPU 44 has detected an open circuit (no trailer). It also goes to sleep in 30 minutes if a load (trailer) is detected and no braking has occurred and no manual or remote input has occurred or neither of the push buttons has been depressed. The seep mode minimizes power usage by limiting current draw and thus prevents running the towing vehicle battery down during times the vehicle is not in use.

The standby circuit 56 includes an electronic switch, which in the preferred embodiment is a transistor Q1, that has a base terminal connected to a sleep mode output port of the MPU 44. The emitter of the transistor Q1 is connected to the output of the regulated power supply 52 while the collector is connected to selected electronic components of the controller 11. The sleep mode is activated upon expiration of a predetermined time period during which the controller 11 does not receive an input signal. As described above, in the preferred embodiment, the predetermined period for activating the sleep mode is 30 minutes; however, the invention also may be practiced utilizing other time periods. Upon actuation, the transistor Q1 is placed into a non-conducting state to prevent the supply of electricity to the selected components and thereby conserve the towing vehicle power supply 23 during periods of towing vehicle inactivity. Upon closure of the towing vehicle brake switch 22 or activation the manual brake controls 38 or 40, the electronic transistor Q1 is placed in a conducting state to supply electric power to the components connected to the collector of the switch. The interruptible voltage supplied by the standby circuit 42 is identified as SV5V in FIG. 2 and the following description.

The controller circuit 36 also includes a battery monitoring circuit 58 that is connected between the towing vehicle power supply 23 and a battery voltage monitoring input port on the MPU 44. The monitoring circuit 58 includes a Zener diode Z1 to limit the voltage applied to the MPU port and a filter capacitor C5. The MPU 44 uses the battery voltage received from the circuit 58 as a self-diagnostic tool. If a battery voltage is present at the MPU input pin, but no output voltage is generated when needed, the MPU 44 determines that a fault has occurred and disables itself while providing a visual warning signal via the digital display 30 to the towing vehicle driver.

An input selection circuit 60 is connected to operational mode port 61 on the MPU 44. As shown in FIG. 2, the input selection circuit 60 provides a connection of the associated MPU port through resistor R31 to ground, which indicates to the operating algorithm that the MPU 44 is to operate in a time based mode as described above. As also described above, the MPU 44 is activated upon closure of the towing vehicle stop light switch 22. As shown in FIG. 2, the third line 28, that connects the brake light side of the brake light switch 22 to the controller 11 in FIG. 1, is connected through a stop light interrupt circuit 62 to a stop cycle input port 63 of the MPU 44. The stop light interrupt circuit 62 includes a pair of Zener diodes to control the magnitude of the voltage applied to the MPU port 63. As shown in FIG. 2, the third line 28 from the brake light side of the stop light switch 22 also is connected to a manual stop light switch circuit 64. The manual stop light circuit is operative upon actuation of either of the manual slide lever 38 or the remote manual control pushbutton 42 to close a relay to connect the trailer stop light lamps 25 with the towing vehicle power supply 23 and thereby illuminate the trailer stop light lamps. The manual stop light switch circuit 64 is fully described in U.S. Pat. No. 6,325,466 which is incorporated herein by reference.

As will be described below, the MPU 44 is responsive to the stop cycle input port 63 going high to generate a Pulse Width Modulated PWM brake control signal at a brake control output port 66. The brake control output port 66 is connected by a brake control line 68 to an output power circuit 70. The output power circuit includes an electronic driver Q3 connected between the towing vehicle power supply voltage VBAT+ and ground. The driver Q3 is connected to the gate of a programmable current sensing high side power switch 72. In the preferred embodiment, an IR3310(S) that is available from International Rectifier Corp. is utilized for the switch 72; however, it will be appreciated that the invention also may be practiced with other power control devices, such as for example, a Field Effect Transistor (FET). The input terminal of the switch 72 is connected to the towing vehicle power supply voltage VBAT+ while the output terminal of the switch 72 is connected though the first line 12 to the towed vehicle brake coils 19. A pair of capacitors C24 and C25 are connected between the switch output terminal and ground to remove any spurious high frequency signals that may be superimposed upon the current being supplied to the bake coils 19. The power switch 72 includes a power MOSFET that is placed in a conducting state when the gate voltage exceeds an input voltage threshold value, $V_{iT}$, and placed in a non-conducting state when the gate voltage is less than the threshold $V_{iT}$. As shown in FIG. 2, the power MOSFET source is connected to the brake coils 19 while the MOSFET drain is connected to the vehicle power supply voltage VBAT+.

The power switch 72 also includes a small MOSFET (not shown) connected in parallel with power MOSFET that is operative to supply a feedback current that is proportional to the current flowing through the power MSOFET to the brake coils 19. The small MOSFET is connected to a current detection circuit 74 that includes a current feedback resistor R33. The voltage developed across the feedback resistor R33, that is proportional to the current being supplied to the brake coils 19 is applied to a current feedback port 76 of the MPU 44. If the voltage across the feedback resistor R33 exceeds a predetermined current shutdown threshold, $T_1$, an over-current condition exists and the MPU 44 will place the switch 72 in its non-conducting state for a predetermined time period. The MPU 44 will also provide a visual warning signal via the digital display 30 to the towing vehicle driver. The power switch 72 also includes temperature protection. If the temperature of the switch exceeds a temperature shutdown threshold, $T_{TEMP}$, the switch 72 will change to its non-conducting state. The switch 72 will remain in a non-conducting state for a predetermined time period to allow the switch to cool down. In the preferred embodiment the predetermined time period is 120 milliseconds to allow sufficient cooling time for all of the components that were subjected to the over-current condition. At the end of the time period, the MPU 44 will reset the switch 72, returning it to its conducting state. However, if the current and/or the temperature still exceeds the corresponding threshold, the power switch 72 will be returned to its non-conducting state for another predetermined time period. Thus, a potential thermal runaway is avoided. The cycling of power switch 72 will continue until the over-current condition ceases.

The output terminal of the switch 72 also is connected to a voltage detection circuit 78 that includes a voltage divider 80 comprising a pair of resistors R7 and R9. The center tap of the voltage divider 80 is connected to a voltage feedback port 82 of the MPU 44. Thus, the voltage detection circuit provides a feedback voltage that is proportional to the brake coil voltage to the MPU 44. The MPU compares the feedback voltage to the desired output voltage to confirm that the controller 11 is operating satisfactorily. Upon detection of a voltage problem, the MPU 44 will provide a visual warning signal via the digital display 30 to the towing vehicle driver, such as for example, an output voltage appearing on the line 12 to the trailer brake coils 19 when none is requested.

The controller circuit 36 further includes a remote manual control circuit 83 that is optional. The circuit 83 includes a four wire connector J4 for connecting the remote manual control 40 to the MPU 44 via a handset cord (not shown). A first connector wire is connected to ground while a second wire is connected to the towing vehicle power supply tap VBAT+. A third wire is connected to a circuit wake up pin 84 of the MPU 44. When the wake up pin 84 goes high upon initial depression of the remote manual control pushbutton 42, the selected controller circuits connected to the sleep mode transistor Q1 are supplied power and the stop light lamps 25 of the towed vehicle are illuminated. A fourth connector wire is connected to a brake signal input pin 85 of the MPU 44 and provides a voltage that is proportional to the amount that the remote manual control pushbutton 42 is depressed. The remote manual control circuit 84 also is described in U.S. Pat. No. 6,557,952, which, as indicated above, has been incorporated herein by reference. If the controller circuit 36 is omitted, the circuit wake up pin 84 is left floating while the brake signal input pin 85 is held high by being connected through a resistor R37 to the regulated voltage supply (not shown).

A five wire connector 86 is included in the circuit 36 and connected to the MPU 44. The connector 86 is utilized for programming the MPU 44 at the manufacturing facility. A first removable jumper E2 is included in a test circuit 88 connected to the MPU 44. The first jumper E2 is inserted at the manufacturing facility and the controller 11 is then tested for satisfactory operation. Upon successfully completing the test, the jumper E2 is removed. A second removable jumper E3 is included in a calibration circuit 90. The second jumper E3 is inserted at the manufacturing facility and the controller is calibrated for the minimum and maximum displacement of the manual slide switch 38. The jumper E3 is then removed and the controller 11 is shipped to the sale outlet. The controller 11 further includes a noise suppression circuit 92 that filters the voltage SV5V supplied by the sleep mode switch Q1.

The operation of the time based controller 11 will now be described. The controller operation follows an algorithm that is stored in the MPU 44 and illustrated by the flow chart shown in FIG. 3. The algorithm is initiated in functional block 100 upon closure of the stop light switch 22 when the driver depresses the towing vehicle brake pedal 21. As described above, closure of the stop light switch 22 applies a voltage to the stop light interrupt circuit 62 which in turn takes the stop cycle input port 63 of the MPU 44 high. In response to the input port 63 going high, the MPU determines whether the controller 11 is in the sleep mode in decision block 102. If the controller 11 is in the sleep mode, the algorithm transfers to functional block 104 where the MPU 44 is turned fully on. Also, the sleep mode transistor Q1 is placed in a conducting state to apply the voltage SV5V to the selected circuit components. Additionally, a sleep counter is reset for eventual return to the sleep mode. The algorithm then advances to functional block 106. If, in decision block 102, the controller 11 is not in the sleep mode, the algorithm transfers directly to functional block 106.

In functional block 106 the MCU 44 begins generating a PWM brake control signal with a preset initial duty cycle. The brake control signal is applied to the output power circuit 70 where the power switch 72 is cycled between its conducting and non-conducting states to supply a PWM output current to the trailer brake coils 19. In the preferred embodiment, the frequency of the output current is 250 Hz; however, the invention also can be practiced with other output current frequencies. Also, in the preferred embodiment, the initial PWM duty cycle is selected such that the initial current supplied to the brake coils 19 will provide an average of 10% of the maximum power available from the controller 11. As before, it will be appreciated that the invention also may practiced with other initial duty cycles to provide a different initial power level to the brake coils 19.

The algorithm then advances to functional block 108 where a brake apply cycle counter is indexed. The algorithm continues to decision block 110 where the bake light switch 22 is again checked. If the brake light switch has opened, it is indicative that the driver has released the towing vehicle brakes. Accordingly, the algorithm transfers to functional block 112 where the MPU 44 terminates the brake control signal. Termination of the brake control signal places the power switch 72 in a non-conducting state and interrupts the current being supplied to the brake coils 19. Accordingly, the towed vehicle brakes are released. Because the braking cycle is ended, the brake application cycle counter is reset in functional block 112. The algorithm then exits through block 114.

Figure 4:
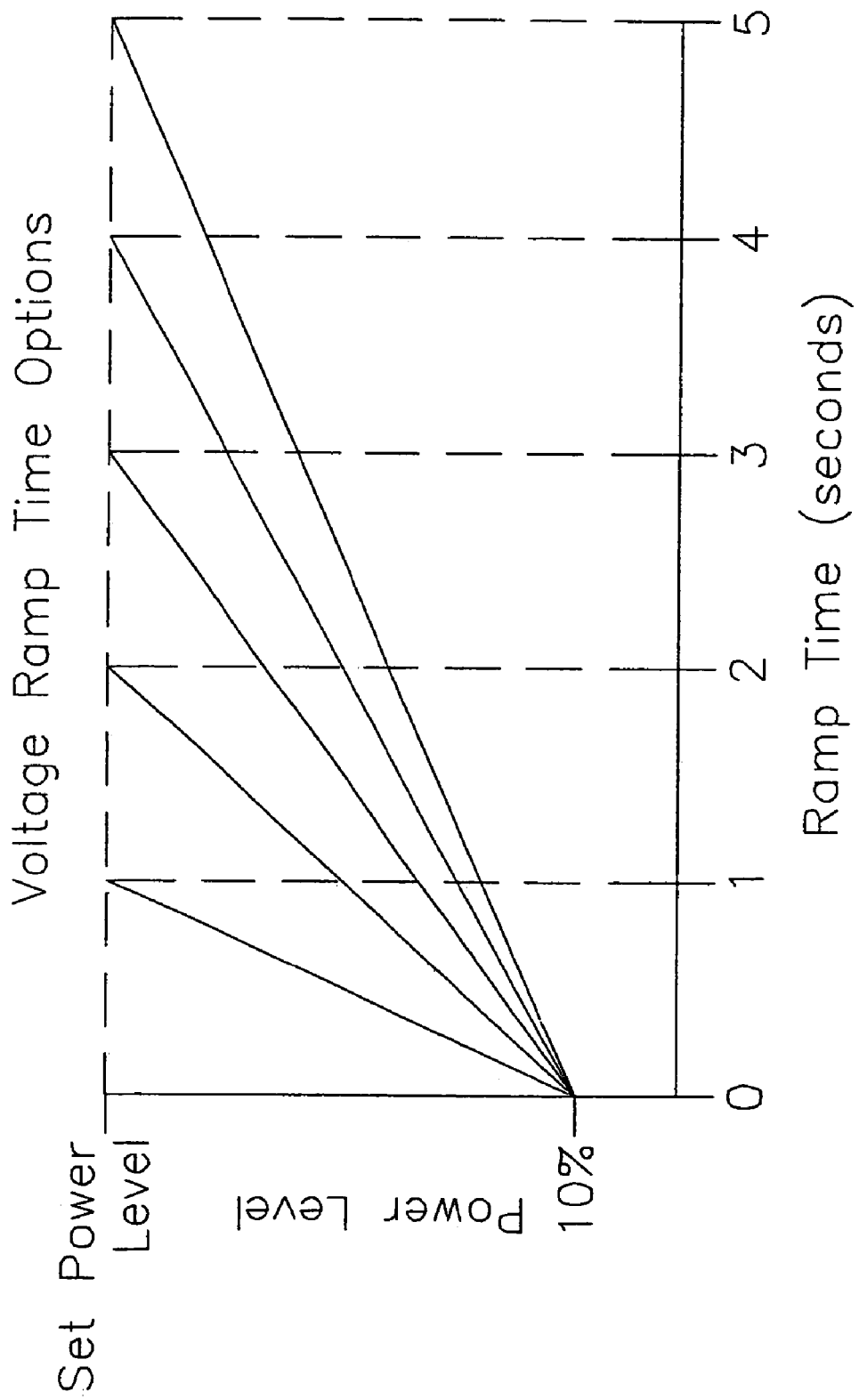
FIG. 4 is a graph illustrating programming options for the controller shown in FIG. 1.

If, in decision block 110, the brake light switch remains closed, the algorithm transfers to functional block 116 where the MPU 44 incrementally increases the brake control signal duty cycle to increase the current, and hence the power, being supplied to the brake coils 19. In the preferred embodiment, the power level continues to increase as long as the brake light switch 22 is held closed until the power reaches a maximum power level set by the driver up to 100% of the maximum power available, which is indicated by "99" upon the two digit display 30. A maximum power level of 50% is initially set at the manufacturing facility. The total elapsed time from the initial brake application to the attainment of maximum set power is referred to as a voltage time ramp. In the preferred embodiment, a voltage time ramp of three seconds is set at the manufacturing facility; however, as will be explained below, the driver may select other voltage time ramps within a range of one to five seconds. The available voltage time ramps are illustrated by the curves shown in FIG. 4 where the center curve represent the preset voltage time ramp. The preset and driver selected maximum set power level and voltage time ramp are stored in the EEPROM 48. Thus, the most recent setting is preserved should the power supply 23 be disconnected from the controller 11. The MPU 44 selects a duty cycle incremental increase that corresponds to both the selected maximum power level and voltage ramp time such that the maximum power level will be reached within the voltage ramp time. In the preferred embodiment, the voltage ramps are linear functions of time, as shown in FIG. 4; however, the invention also may be practiced with voltage ramps that are non-linear functions of time (not shown).

After increasing the power level, the algorithm advances to decision block 117 where the MPU 44 determines whether the maximum power level has been reached. In the embodiment illustrated in FIG. 3, the brake application counter is compared to a final value, that is, the duration of the ramp time is checked. Alternately, the output power could be compared to the maximum set power level to determine whether the final level has been reached. If the ramping up of the power level is not completed, the algorithm transfers back to functional block 108 where the brake apply counter is again indexed. The algorithm then continues to increase the power being supplied to the brake coils 19, as described above.

If, in decision block 117, the MPU determines that the ramping up of the power is completed, the algorithm transfers to decision block 118 where the bake light switch 22 is again checked. If the brake light switch 22 has opened, it is indicative that the driver has released the towing vehicle brakes. Accordingly, the algorithm transfers to functional block 112 where the MPU 44 terminates the brake control signal to release the brakes and the algorithm is exited, as described above. If, in decision block 120, the MPU 44 determines that the brake light switch 22 is still closed, the algorithm transfers to functional block 119 where the output power is maintained at the maximum set power level. The algorithm then returns to decision block 120 where it continues to monitor the condition of the brake light switch 22.

Figure 3:
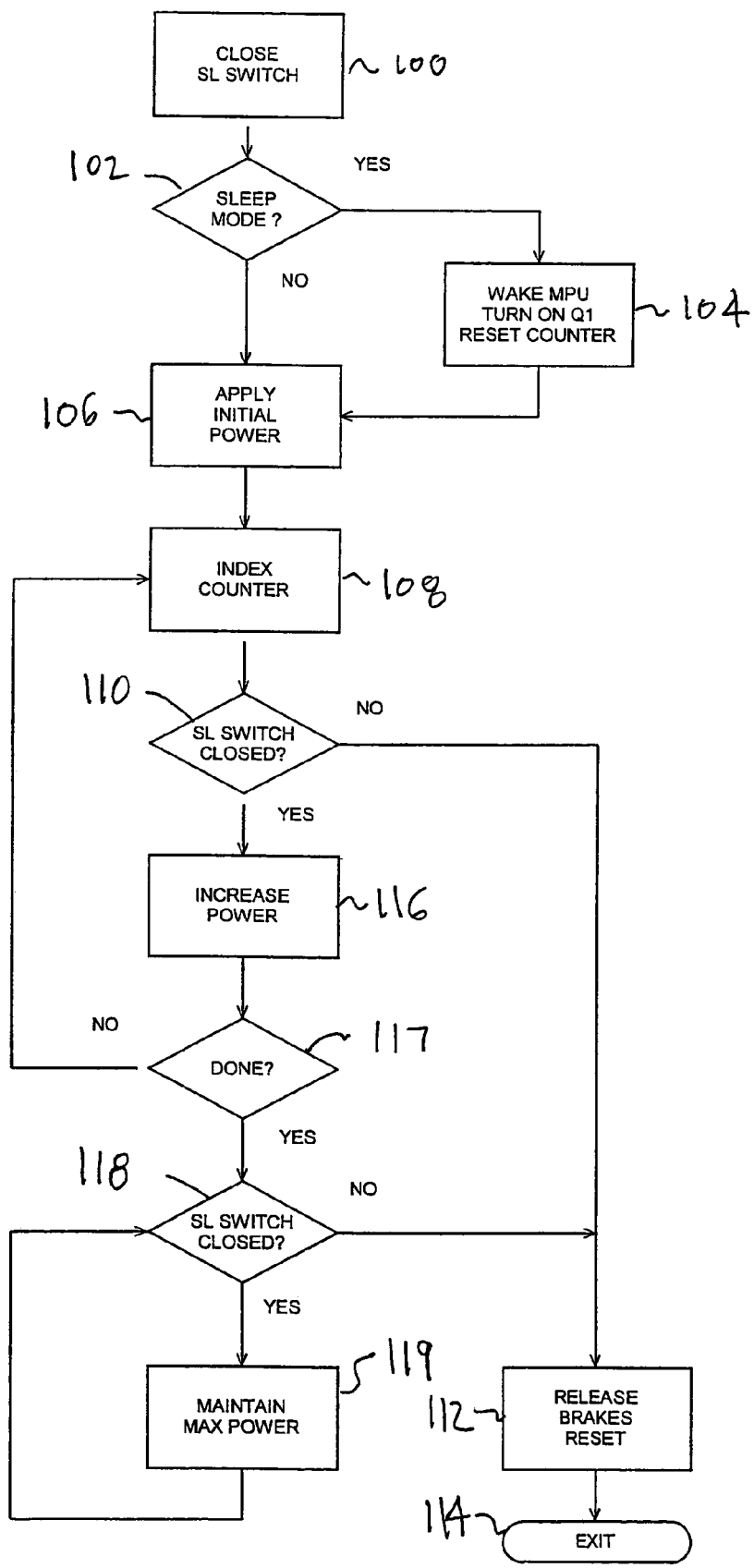
FIG. 3 is a flow chart illustrating the operation of the controller shown in FIG. 1.

It will be appreciated the flow chart shown in FIG. 3 is intended to exemplary and that the operation of the invention also may be practiced other than is shown in the figure. Additionally, while not shown in FIG. 3, a signal received from either of the manual controls 38 or 40 that exceeds the ramp signal will override the ramp signal.

The MPU 44 continuously monitors battery voltage, output voltage and output current. The controller can be set by the towing vehicle driver to display the output Power, output Voltage or output Current upon the digital display 30. The display 30 shows a "P" for power display mode, "C" for current display mode and "E" for voltage display mode. These letters are always displayed while the controller is awake and brake coils 19 are detected by the MPU as being connected to the controller 11.

During normal operation, the driver of the towing vehicle may select an output display mode for the digital display 30. Upon repeated pressing the "+", or plus, pushbutton 34, the display will cycle thorough the letters P, E, and C. The letter will flash when displayed. When the desired mode is displayed, it may be selected by pressing and holding the "−", or minus, pushbutton 32, until the flashing stops. The mode will then be selected, and, upon actuation of the trailer brakes 13 and 14, two digits will be displayed, representing the percentage of the maximum available power for the power mode, and, for the voltage or current modes, the average applied voltage or current, being supplied to the trailer brakes by the controller 11. It is recommended that the output power value be displayed and that the output current value be used only for trouble shooting or setting up the controller 11. The output current value can be used to ensure that the amperage draw of the trailer brakes is in the proper range for the number of axles on the towed vehicle. The output current should not be displayed during operation because the reading may vary significantly due to temperature swings in the brake magnets. The output voltage could be selected for display, however, the actual output voltage may vary from the displayed voltage during a brake application.

An alternate embodiment of the controller also may be used with electro-hydraulic trailer brakes (not shown). Such brakes present a very high impedance to the brake controller, however, the alternate embodiment is designed to function when connected either electro-hydraulic or straight electric trailer brakes. The alternate controller includes three additional modes besides the ones described above, namely, PH, EH and CH, corresponding to values of output Power-Hydraulic brakes, output Voltage-Hydraulic brakes and output Current-Hydraulic brakes, respectively.

As indicated above, the invention contemplates adjustment of the both the maximum set power level and the voltage ramp time parameters by driver of the towing vehicle. The adjustment of the parameters is implemented by selective operation of the pushbuttons 32 and 34, while coded signals are provided by the digital display 30. The voltage ramp time may be set between one and five seconds in one second increments while the maximum output power may be set may be set in five percent increments from 10% to 100%.

Figure 5:
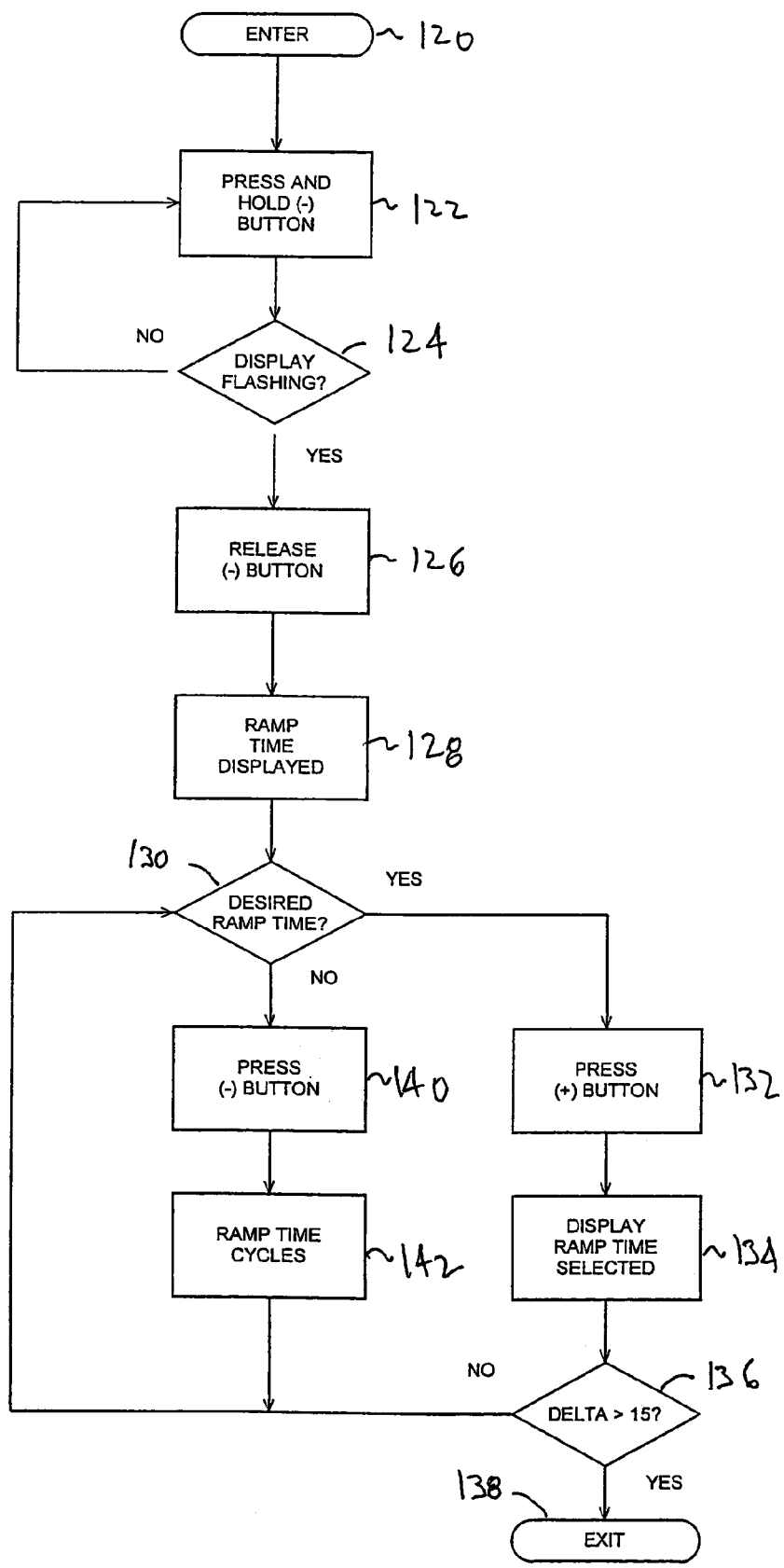
FIG. 5 is flow chart illustrating the selection of the ramp time for the controller shown in FIG. 1.

A flow chart for setting the ramp time is shown in FIG. 5. The flow chart is entered through block 120 and proceeds to functional block 122 where the towing vehicle driver presses and holds the minus pushbutton 32. The flow chart advances to decision block 124 where the driver checks whether the digital display 30 is flashing. If the display is not flashing, the flow chart returns to functional block 122 as the driver continues to depress the minus pushbutton 32. Upon the display flashing, the flow chart advances to functional block 126 where the driver releases the minus pushbutton 32. The display will then display and flash the current ramp time setting, as shown in functional block 128. As described above, a value of three seconds is preset by the manufacturer and stored in the EEPROM 48, as is the last value set by the driver. Accordingly, the last setting placed in the EEPROM 48 will be displayed in functional block 128.

The flow chart advances to decision block 130, where the driver decides whether the displayed ramp time is satisfactory. If the displayed ramp time is satisfactory, the driver depresses and holds the plus pushbutton 34 in functional block 132 until the flashing of the digital display 30 stops. When the flashing stops, the driver releases the plus pushbutton 34, setting the ramp time, and the flow chart advances to functional block 134 where the newly set ramp time is stored in the EEPROM 28 and the value is displayed for 15 seconds, after which the display 30 will revert to the normal display mode. The flow chart then advances to decision block 136 and checks if the plus pushbutton 34 has been pressed within the last 15 seconds to select another value. If the plus pushbutton 34 has not been pressed during the last 15 seconds, the flow chart exits through block 138. However, if the plus pushbutton 34 has been pressed during the last 15 seconds, the flow chart returns to decision block 130.

If, in decision block 130, the desired ramp time is not displayed, the flow chart advances to functional block 140 where the driver presses the minus pushbutton 32 to cycle through the available ramp times. Upon pressing the minus pushbutton 32, the flow chart cycles to the next value for the ramp time, which is displayed upon the digital display 30 and then returns to decision block 130. The driver continues in the cycle loop until the desired ramp time is displayed, at which point, the driver presses the plus pushbutton 34, as described above, to select the displayed ramp time.

Figure 6:
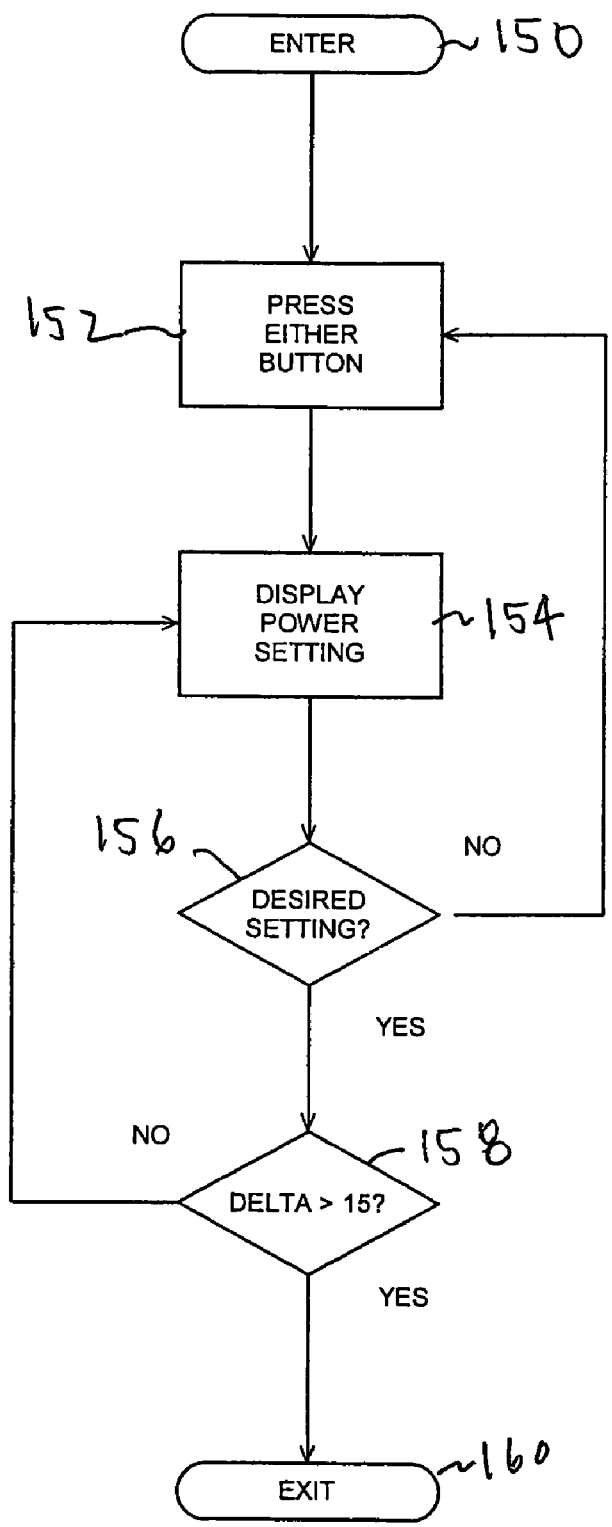
FIG. 6 is a flow chart illustrating the selection of the maximum power output level for the controller shown in FIG. 1.

A flow chart for setting the maximum output power is shown in FIG. 6. The flow chart is entered through block 150 and proceeds to functional block 152 where the driver momentarily depresses either the minus or the plus pushbutton, 32 or 34 to cause the controller to display the current maximum power setting, as shown in functional block 154. The maximum power is the percentage of available power that is sent to the towed vehicle brakes upon completion of the voltage ramp time. The controller 11 is preset at the manufacturer with a maximum power setting of 50%, which is stored in the EEPROM 48.

The flow chart then advances to decision block 156 where the driver decides whether the setting is satisfactory. If the setting is not satisfactory, the driver returns to functional block 152 and driver either presses the plus pushbutton 34 to increase the maximum power setting, or the driver presses the minus pushbutton 32 to decrease the maximum power setting. Each time one of the buttons is depressed, the maximum power setting is incrementally changed by five percent. When the selected pushbutton is pressed, the new value is immediately changed and the new setting is both displayed and stored in the EEPROM 48. If the new value is the desired value, the driver does nothing for 15 seconds. Accordingly, the flow chart advances to decision block 158 where the time period since the last pushbutton input, $\Delta T$, is compared to the time period of 15 seconds. If $\Delta T$ is less than 15 seconds, the flow chart returns to functional block 154 where the current setting is displayed and continues in the loop until either one of the pushbuttons 32 or 34 is again depressed or the time period $\Delta T$ is exceeded. Once $\Delta T$ is greater than 15 seconds, the flow chart exits through block 160.

It will be appreciated the flow charts shown in FIGS. 5 and 6 are intended to exemplary and that the operation of the invention also may be practiced other than is shown in the figures.

The MPU 44 continuously monitors parameters and conducts self-tests of the towed vehicle, the towing vehicle or the controller itself. Upon detecting a fault or problem, the MPU 44 will display a flashing symbol upon the digital display 30. As described above, the MPU 44 also is operative to flash various symbols and numbers upon the digital display 30 that are used to set up and monitor the performance of the towed vehicle brakes 13 and 14. For the preferred embodiment, the various available symbols, with descriptive captions, are illustrated in FIG. 7. The operating mode displays for power, voltage and current, which were described above, are also shown in FIG. 7. Several of the self-tests and the corresponding symbols shown in FIG. 7 are described in the following paragraphs. The other captions shown in FIG. 7 that are not described are considered self-explanatory.

If the current being supplied to the brake coils 19 is above the controller's rating, up to a fixed limit, the MPU 44 will flash "CL" upon the digital display 30 to inform the driver know that the current being generated is higher than the rated value. The controller 11 continues to supply all of the current required by the load but signals the operator of the high current usage even if the controller display is set in power display or voltage display mode.

The MPU 44 flashes "SC" upon the digital display 30 any time it detects a short circuit in the output line 12 connected to the trailer brake coils 19. The MPU 44 tests for short circuits every 5 seconds while awake and continuously during braking cycles. Prior art controllers only check for shorts during actual braking cycles. This improved method will alert the driver that there is a short in the brake coil line before the brakes are applied.

Similarly, the MPU 44 checks for an open circuit in the output line 12 connected to the trailer brake coils 19 every 5 seconds. If an open circuit is detected, a flashing "OC" is displayed upon the digital display 30. This will alert the operator when the trailer connection is detached. This will be useful if the operator forgets to attach the trailer to the towing vehicle or if the trailer is detached without his knowledge.

If the MPU 44 detects that the hazard flashers are on, "HF" is flashed upon the display 30 and the MPU 44 does not turn on the output. This makes the controller immune to hazard flasher operation and alerts the operator that the hazard flashers are on.

If the MPU 44 detects a voltage on the blue output wire when the output is off, it flashes "bF" upon the display 30 for blue wire fault. This is a frequent problem during installation when the blue wire is inadvertently connected to a voltage source or a strand in the connector has connected a voltage to the blue wire. It is noted that the blue wire referred to in the "Blue Fault" code is the controller output line 12 connected to the towed vehicle brakes 13 and 14.

The MPU 44 also displays 8.8. upon the display 30 for a few seconds when the controller 11 is first powered up to demonstrate that all of the display elements are working.

Figure 8:
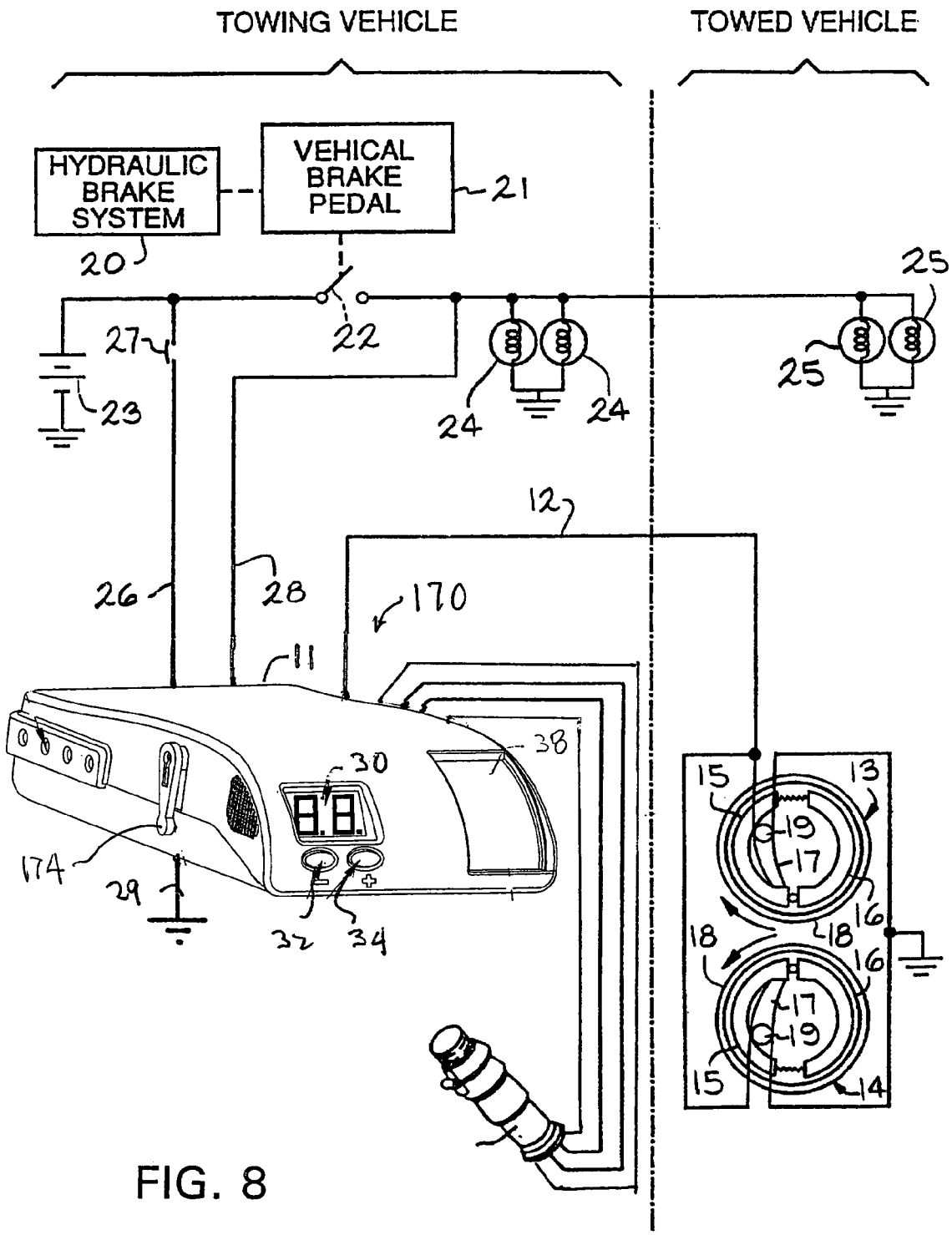
FIG. 8 is a schematic circuit drawing of an alternate embodiment of the brake controller shown in FIG. 1.
Figure 9A:
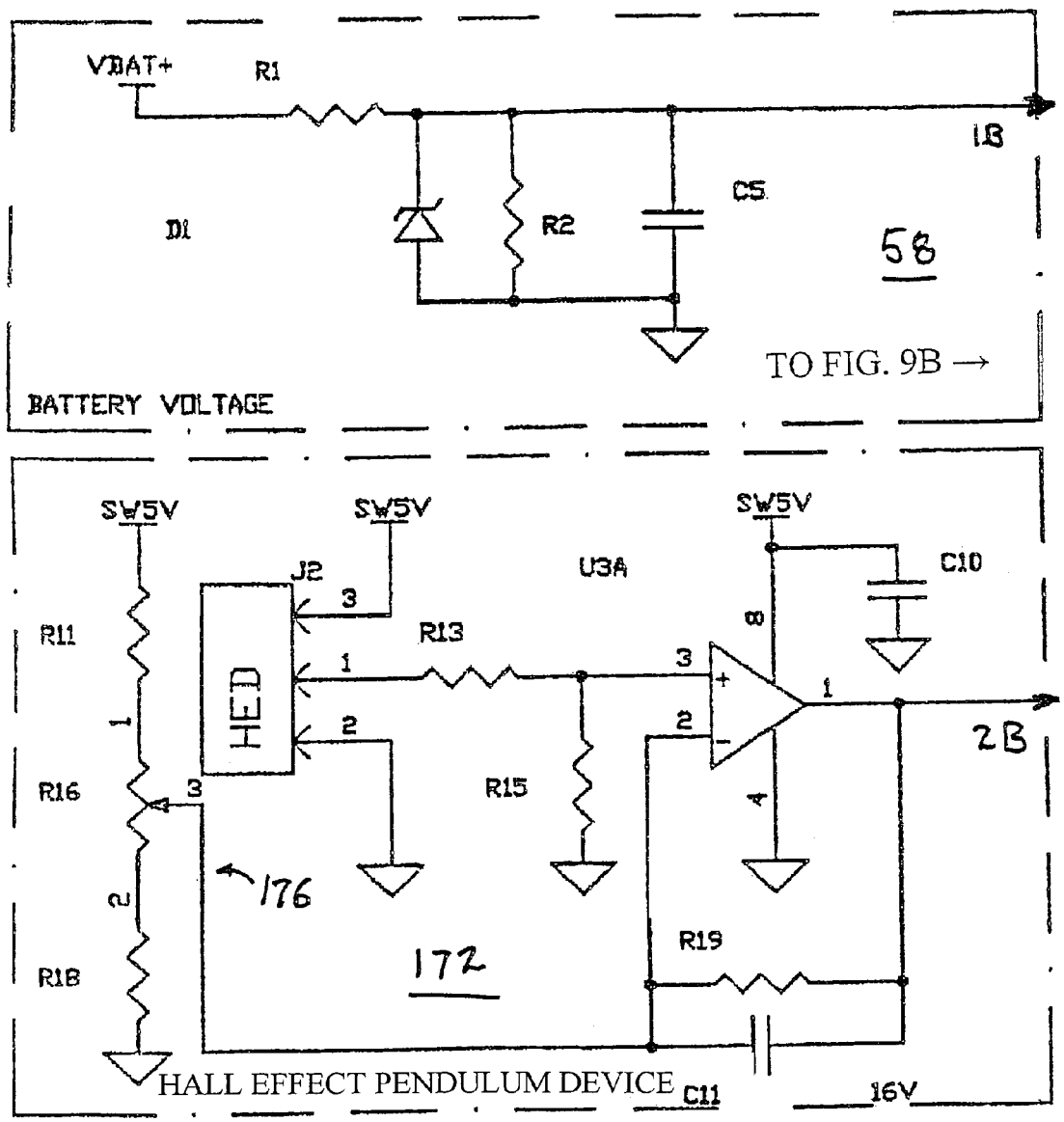
Figure 9B:
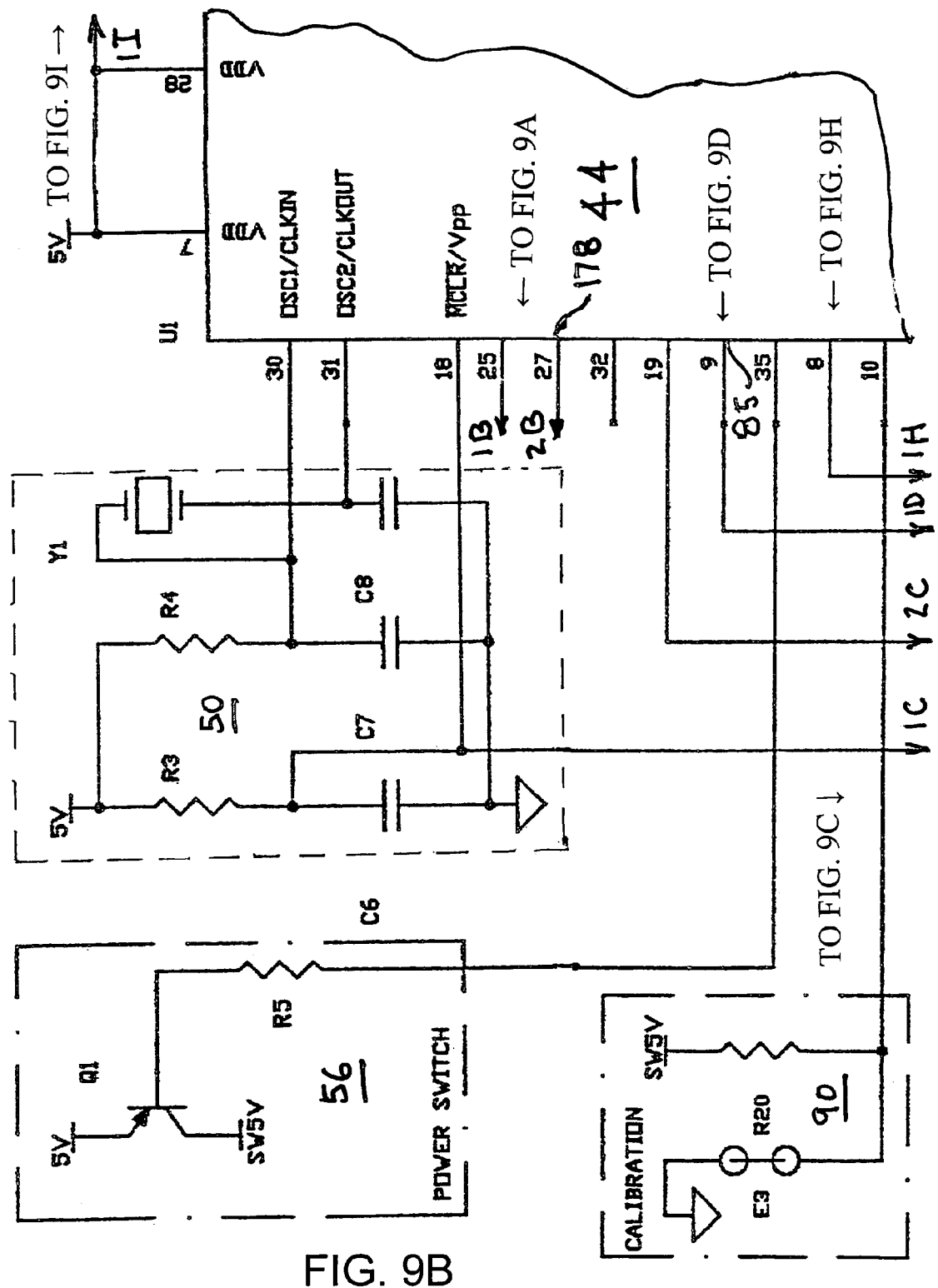
Figure 9D:
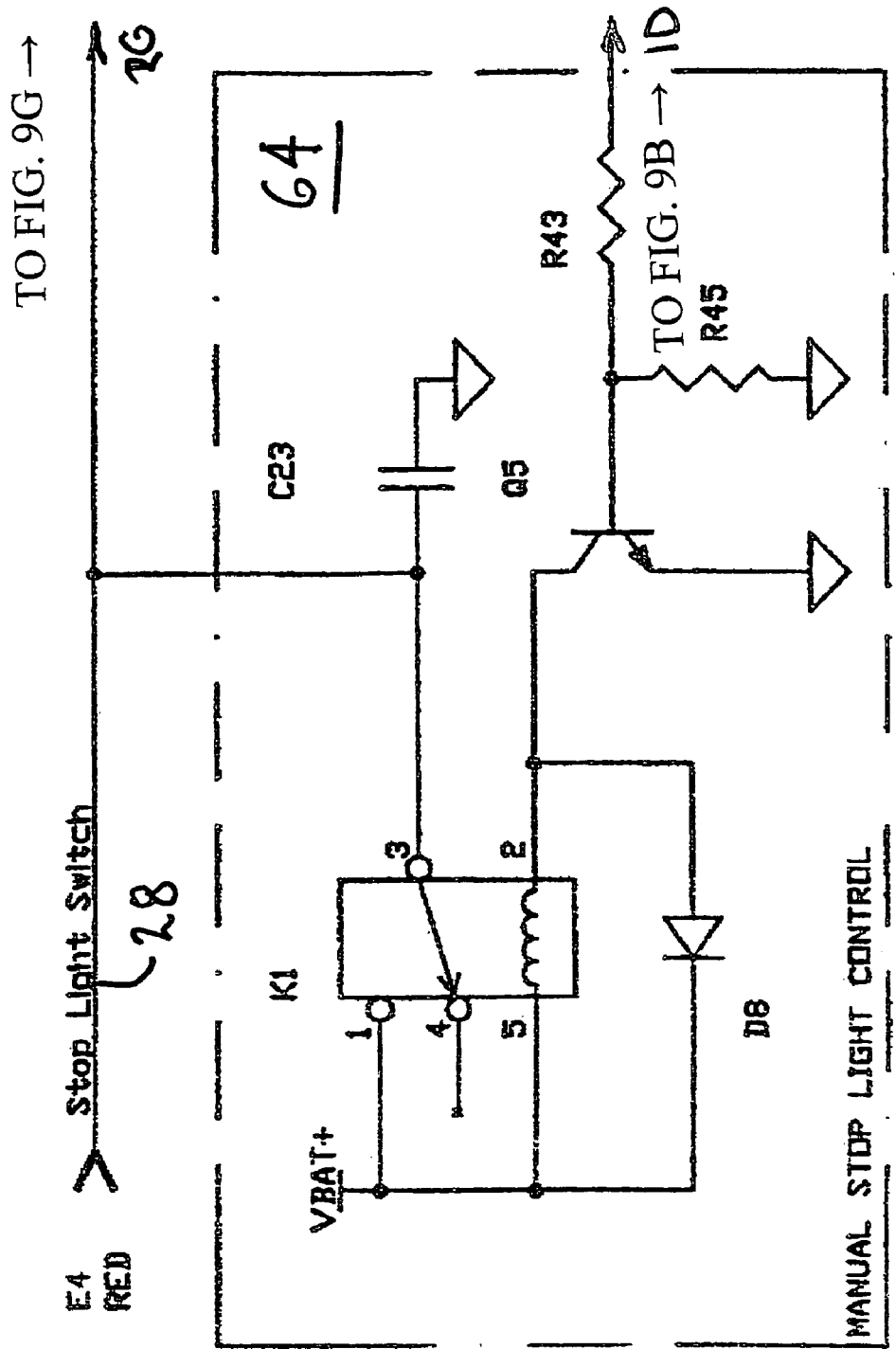
Figure 9E:
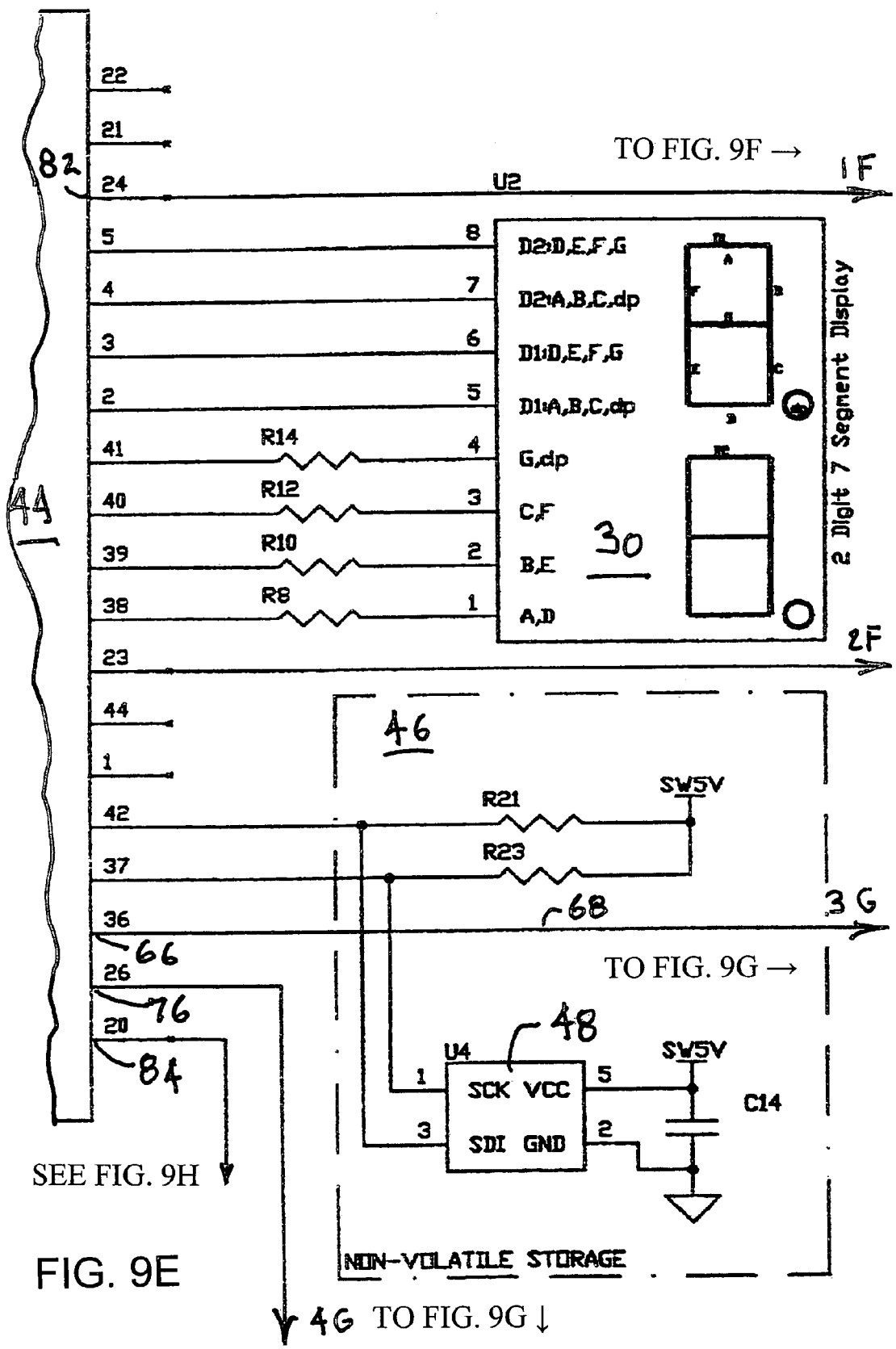
Figure 9F:
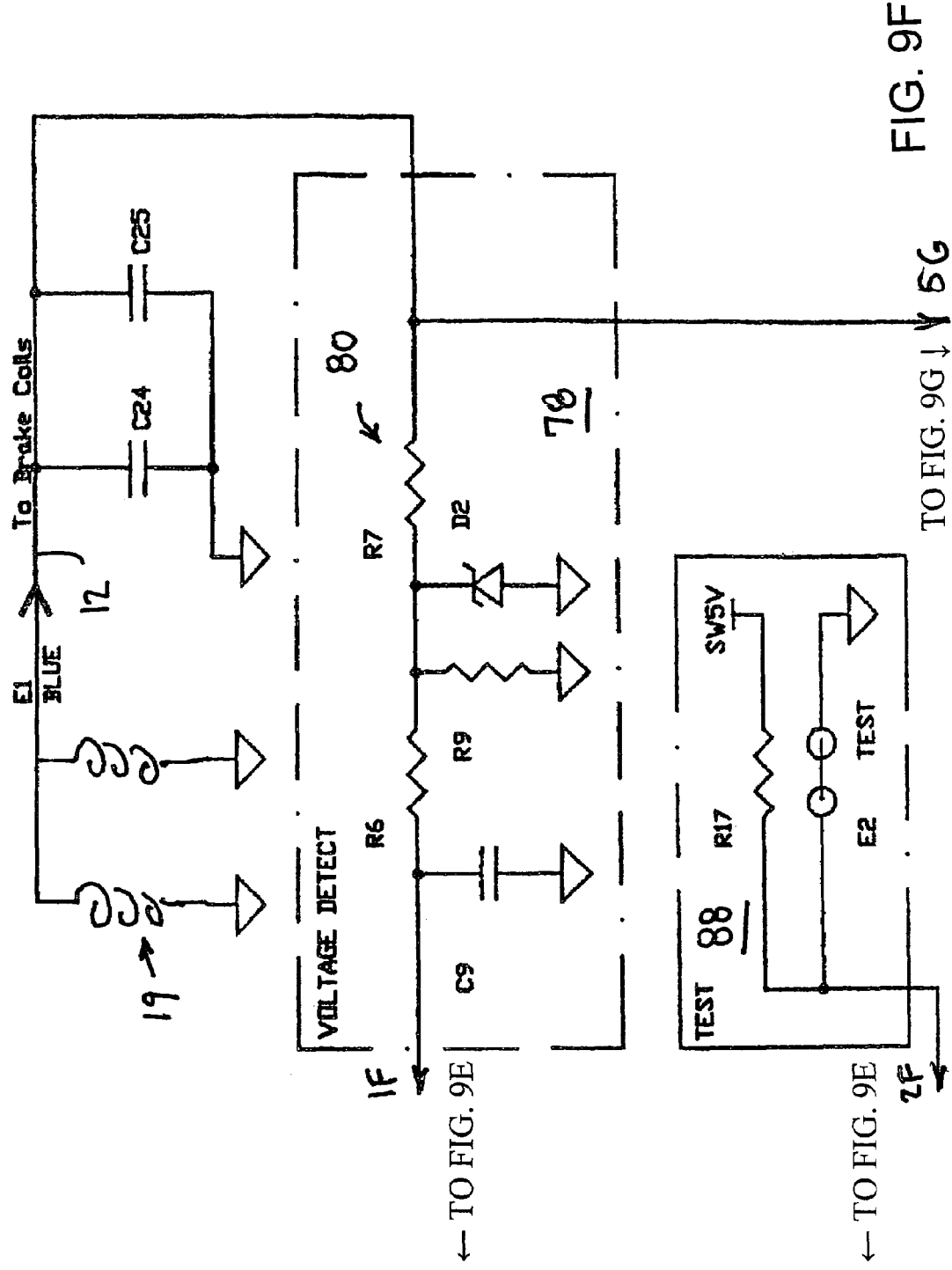
Figure 9H:
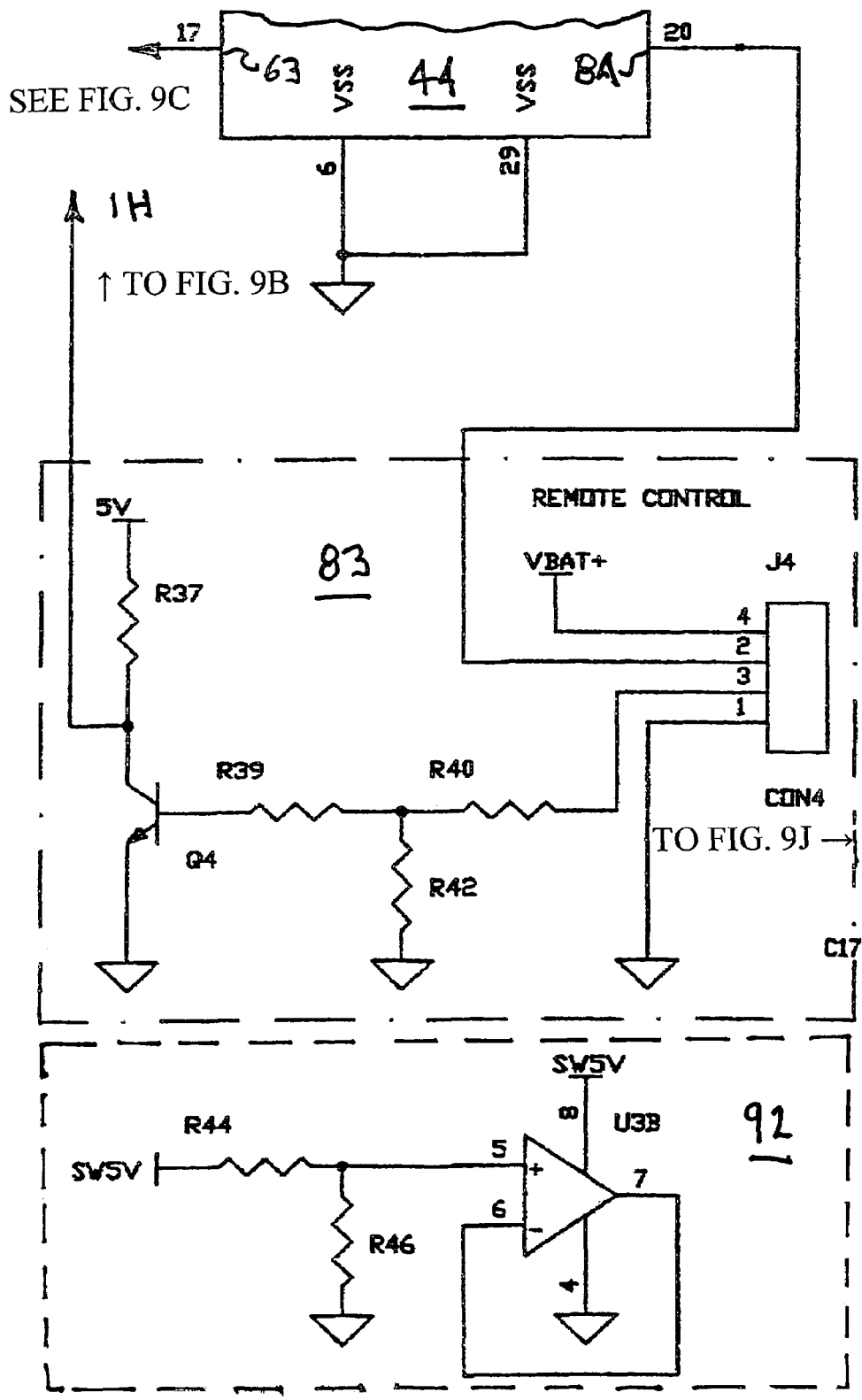
Figure 9I:
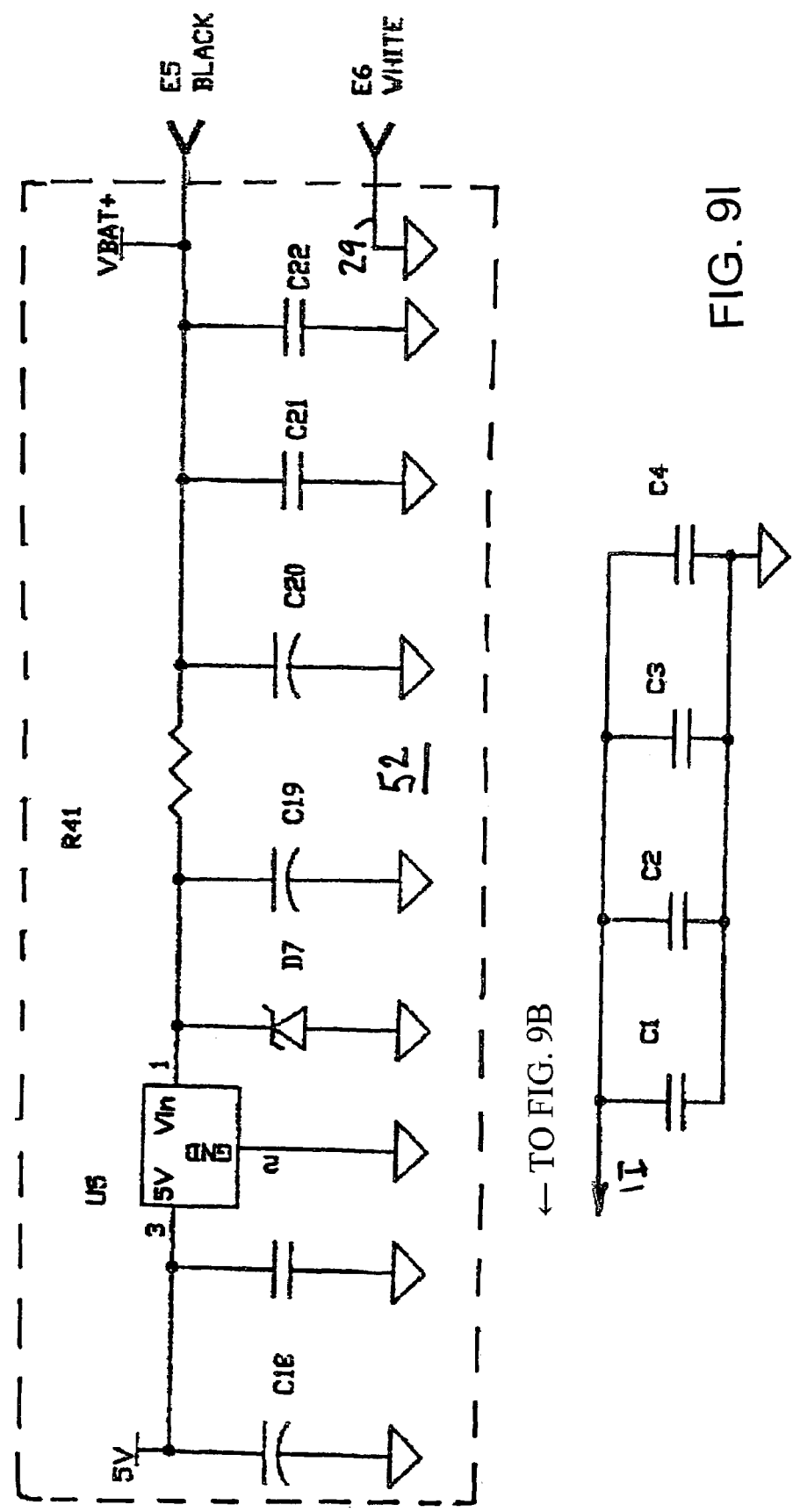
Figure 9J:
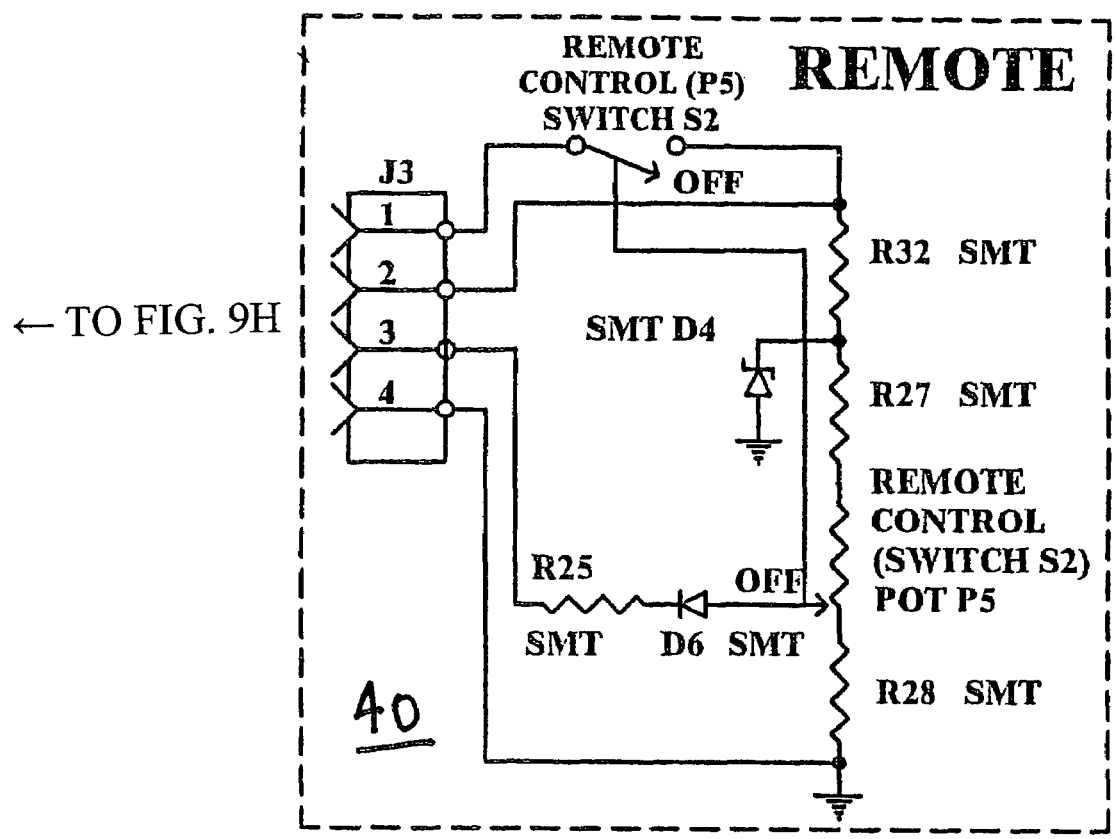

The present invention also contemplates an alternate embodiment as an electronic controller 170, as shown in FIG. 8, that includes an internal sensor that senses the deceleration of the towing vehicle and generates a brake signal that is proportional to the deceleration. The controller 170 then generates an electric current that is proportional to the brake signal and is supplied to the trailer brake coils 19. Components in FIG. 8 that are similar to components shown in FIG. 1 have the same numerical designators.

A circuit diagram of the electronic controller 170 is shown generally at 171 in FIGS. 9A through 9J, where components that are similar to components shown in FIGS. 2A through 2J have the same numerical designators. In the preferred embodiment, the electronic controller 170 includes a Hall effect pendulum device 172 as described in U.S. Pat. No. 6,367,588, which is incorporated herein by reference. While a Hall effect device is illustrated and described, it will be appreciated that the invention also may be practiced with other deceleration sensing devices. The pendulum includes an external lever 174 that is used to adjust the sensitivity of the device 170. Pushing the pendulum lever 174 toward the front of the towing vehicle will provide a momentary delay to the application of the towed vehicle brakes while pulling the lever 174 toward the rear of the towing vehicle will provide more aggressive braking. The controller 170 may be installed below the dashboard of the towing vehicle at an angle within a range of $-35°$ to $+90°$ with the horizontal. The pendulum device 172 includes a potentiometer 174 that is used to calibrate the device for the controller mounting angle. The pendulum device generates a brake signal that is applied to a brake signal input pin 178 of the MPU 44. The MPU 44 is responsive to the brake input signal to generate a PWM signal at the brake control output port 66 having a duty cycle that is proportional to the magnitude of the brake input signal.

The controller circuit 171 also includes an input selection circuit 180 that comprises the interruptible standby voltage SV5V connected through a resistor R29 to the operational mode port 61 of the MPU 44. The resulting high voltage at the operational mode port 61 signals the MPU 44 to select the coding stored in its internal ROM memory that corresponds to the brake signal generated by the pendulum device 172. The controller 170 also includes two calibration circuits 88 and 90. The first calibration circuit 88 functions as described above for the time based controller 11. The second calibration circuit 90 is utilized to calibrate the pendulum device 172. With the controller 170 in a horizontal position and the second jumper E3 inserted, the external lever 174 is moved first to vertical position and the internal potentiometer 176 adjusted such that a zero brake signal is produced, which is equivalent to 0 g deceleration. The external lever 174 is then moved to a position forming a 30° angle with the horizontal and the internal potentiometer 176 adjusted such that a brake signal is produced which is equivalent to 0.5 g deceleration. Both a manual brake slide lever 38 and a remote manual brake control 40 are also included in the controller 170, as shown in FIG. 9; however, as with the controller 11 shown in FIG. 2, the remote manual control 40 is optional. If the remote manual control 40 is omitted, the circuit wake up pin 84 is left floating while the brake signal input pin is held high by being connected through a resistor R37 to the regulated voltage supply (not shown). The manual slide lever 38 is calibrated as described above. As before, upon exceeding the brake signal generated by the pendulum device 172, both manual brake controls 38 and 40 override the pendulum device brake control signal. The remaining portions of the controller circuit 171 are the same and function as the same described above for the time based controller 11.

Figure 10:
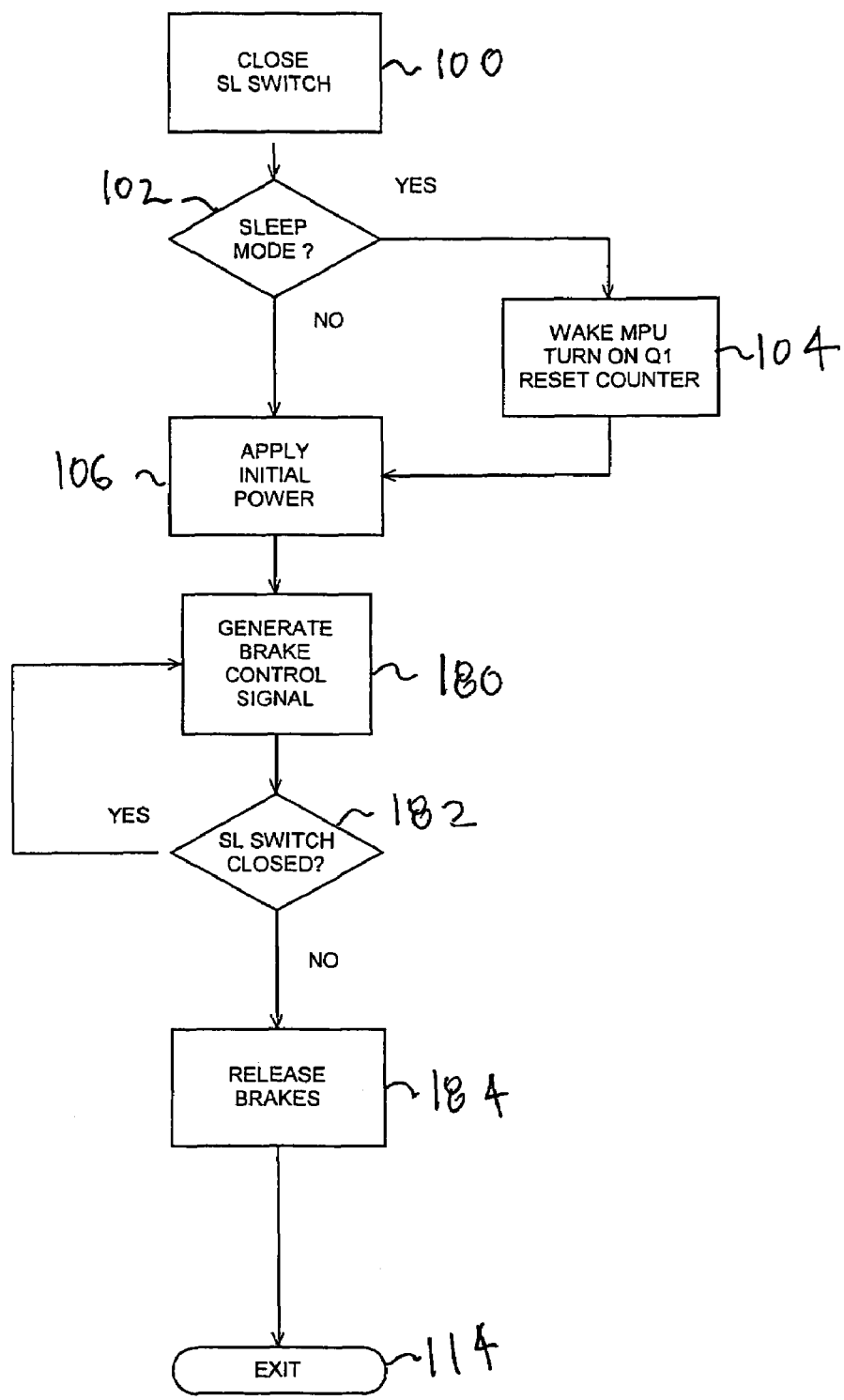
FIG. 10 is a flow chart illustrating the operation of the controller shown in FIG. 8.

The operation of the electronic controller 170 will now be described. The controller 170 follows an operating algorithm that is stored in the MPU 44 and illustrated by the flow chart shown in FIG. 10 where steps that are similar to steps shown in FIG. 3 have the same numerical designators. Control is initiated upon closure of the stop light switch. Closure of the stop light switch 22 applies a voltage to the stop light interrupt circuit 62 which in turn takes the stop cycle input port 63 of the MPU 44 high. In response to the input port 63 going high, the MPU determines whether the controller 11 is in the sleep mode in decision block 102. If the controller 11 is in the sleep mode, the algorithm transfers to functional block 104 where the MPU 44 is turned fully on. Also, the sleep mode switch Q1 is placed in a conducting state to supply power SV5V to the selected circuit components. Additionally, a sleep counter is reset for eventual return to the sleep mode. The algorithm then advances to functional block 106. If, in decision block 102, the controller 11 is not in the sleep mode, the algorithm transfers directly to functional block 106.

In functional block 106 the MPU 44 begins generating a PWM brake control signal with a preset initial duty cycle. The brake control signal is applied to the output power circuit 70 where the power switch 72 is cycled between its conducting and non-conducting states to supply a PWM output current to the trailer brake coils 19. In the preferred embodiment, the frequency of the output current is 250 Hz; however, the invention also can be practiced with other output current frequencies. Also in the preferred embodiment, the initial PWM duty cycle is preset by the manufacturer such that the initial current supplied to the brake coils 19 will provide an average of 10% of the maximum power available from the controller 11. However, as will be described below, the initial power level may be reset by the driver of the towing vehicle.

After the initial current is applied to the brake coils 19, the algorithm advances to functional block 180 where the MPU 44 continues to generate an output brake control signal having a duty cycle that is directly proportional to the magnitude of the brake signal received from the pendulum device 172. Thus, the braking force supplied by the towing vehicle brakes will be directly proportional to the magnitude of the sensed deceleration of the towing vehicle. The MPU 44 does limit the brake control signal to a maximum duty cycle that corresponds to a maximum power output to the towed vehicle brakes. The maximum duty cycle is preset by the manufacturer such that the maximum current supplied to the brake coils 19 will provide an average of 50% of the maximum power available from the controller 11. However, as will be described below, the maximum power may be reset by the driver of the towing vehicle. Because the duty cycle of the brake control signal is proportional to the output signal received from the pendulum device 172, the invention contemplates that the initial power level also is the minimum power level produced by the controller 170.

The algorithm continues to decision block 182 where the condition of the bake light switch 22 is checked. If the brake light switch 22 has opened, it is indicative that the driver has released the towing vehicle brakes. Accordingly, the algorithm transfers to functional block 184 where the MPU 44 terminates the brake control signal to release the towed vehicle brakes. The algorithm is then exited through block 114. If, in decision block 182, the MPU 44 determines that the brake light switch 22 is still closed, the algorithm transfers back to functional block 180 where the MPU 44 continues to generate a PWM brake control having a duty cycle that is proportional to the strength of the brake signal received from the pendulum device 172. The algorithm then returns to decision block 182 where it again monitors the condition of the brake light switch 22.

Similar to the time based controller 11 described above, the driver of the towing vehicle may select an output display mode for the digital display 30 of the controller 170. Upon repeated pressing the plus pushbutton 34, the display will cycle thorough the letters P, E, and C, for values of output Power, output Voltage and output Current, respectively. The letter will flash when displayed. When the desired mode is displayed, it may be selected by pressing and holding the minus pushbutton 32, until the flashing stops. The mode will then be selected, and, upon actuation of the trailer brakes 13 and 14, two digits will be displayed, representing the percentage of the maximum available power for the power mode, and, for the voltage or current modes, the average applied voltage or current, being supplied to the trailer brakes by the controller 11. It is again recommended that the output voltage power be displayed and that the output current value be used only for trouble shooting or setting up the controller 11. The output current value can be used to ensure that the amperage draw of the trailer brakes is in the proper range for the number of axles on the towed vehicle The output current should not be displayed during operation because the reading may vary significantly due to temperature swings in the brake magnets.

Again, an alternate embodiment of the controller 170 also may be used with electro-hydraulic trailer brakes (not shown). Such brakes present a very high impedance to the brake controller, however, the alternate embodiment is designed to function when connected either electro-hydraulic or straight electric trailer brakes. The alternate controller includes three additional modes besides the ones described above, namely, PH, EH and CH, corresponding to values of output Power-Hydraulic brakes, output Voltage-Hydraulic brakes and output Current-Hydraulic brakes, respectively.

As described above, the initial output power level is preset at 10%. However, the controller 170 includes the capability to reset the initial power level in 5% increments up to a maximum of 25%. This allows the towing vehicle operator to select a minimum turn on power level that corresponds to different load ratios between the towing vehicle weight and the load weight. For example, if the load is a lot heavier than the towing vehicle, the minimum turn on can be set to 25% while a light utility trailer should use 10% minimum turn on. While the initial output power range may be set within 10% to 25% in the preferred embodiment, it will be appreciated that the invention also may be practiced with other minimum output power setting ranges, such as for example, 5% to 30%.

Figure 11:
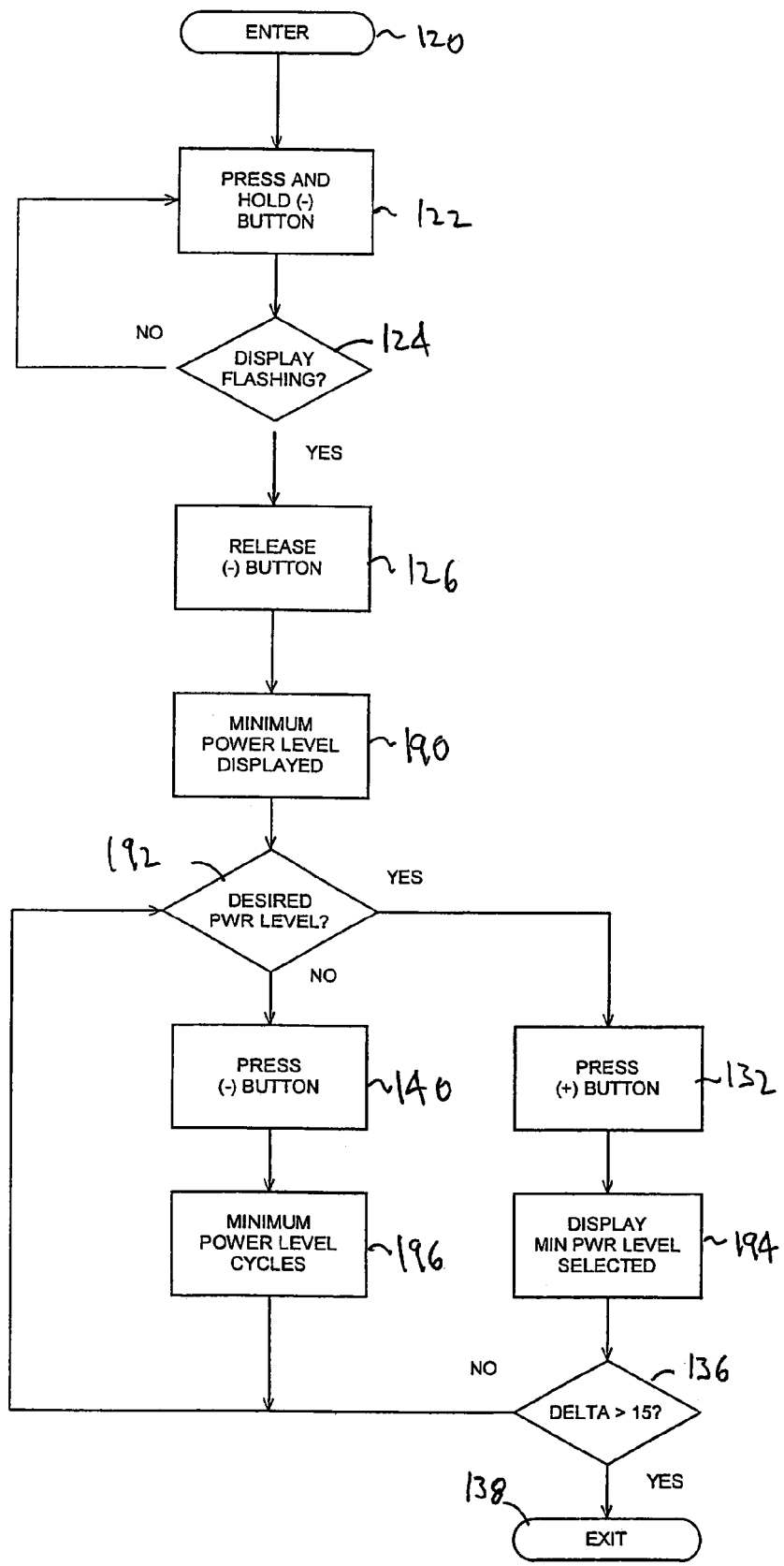
FIG. 11 is flow chart illustrating the selection of the initial power output level for the controller shown in FIG. 8.

A flow chart for setting the initial output power level is illustrated in FIG. 11 where blocks that are similar to blocks shown in FIG. 5 have the same numerical designators. The flow chart is entered through block 120 and proceeds to functional block 122 where the towing vehicle driver presses and holds the minus pushbutton 32. The flow chart advances to decision block 124 where the driver checks whether the display is flashing. If the display is not flashing, the flow chart returns to functional block 122 as the driver continues to depress the minus pushbutton 32. Upon the display flashing, the flow chart advances to functional block 126 where the driver releases the minus pushbutton 32. The display will then display and flash the current initial power time setting, as shown in functional block 190. As described above, either a value of 10% as preset by the manufacturer and stored in the EEPROM 48, or the last value set by the driver is stored in the EEPROM. Accordingly, the last setting placed in the EEPROM 48 will be displayed in functional block 190.

The flow chart advances to decision block 192, where the driver decides whether the displayed initial power time setting is satisfactory. If the initial power time setting is satisfactory, the driver depresses and holds the plus pushbutton 34 in functional block 132 until the flashing of the display stops. When the flashing stops, the driver releases the plus pushbutton 34, setting the initial power setting, and the flow chart advances to functional block 194 where the newly set initial power setting is stored in the EEPROM 28 and the value is displayed for 15 seconds, after which the display 30 will revert to the normal display mode. The flow chart then advances to decision block 136 and checks if the plus pushbutton 34 has been pressed within the last 15 seconds to select another value. If the plus pushbutton 34 has not been pressed during the last 15 seconds, the flow chart exits through block 138. However, if the plus pushbutton 34 has been pressed during the last 15 seconds, the flow chart returns to decision block 192.

If, in decision block 192, the desired initial power setting is not displayed, the flow chart advances to functional block 140 where the driver presses the minus pushbutton 32 to cycle through the available ramp times. Upon pressing the minus pushbutton 32, the flow chart cycles to the next value for the initial power time setting, which is displayed upon the digital display 30, and then returns to decision block 192. The driver continues in the cycle loop until the desired initial power setting is displayed, at which point, the driver presses the plus pushbutton 34, as described above, to select the displayed initial power setting.

Figure 12:
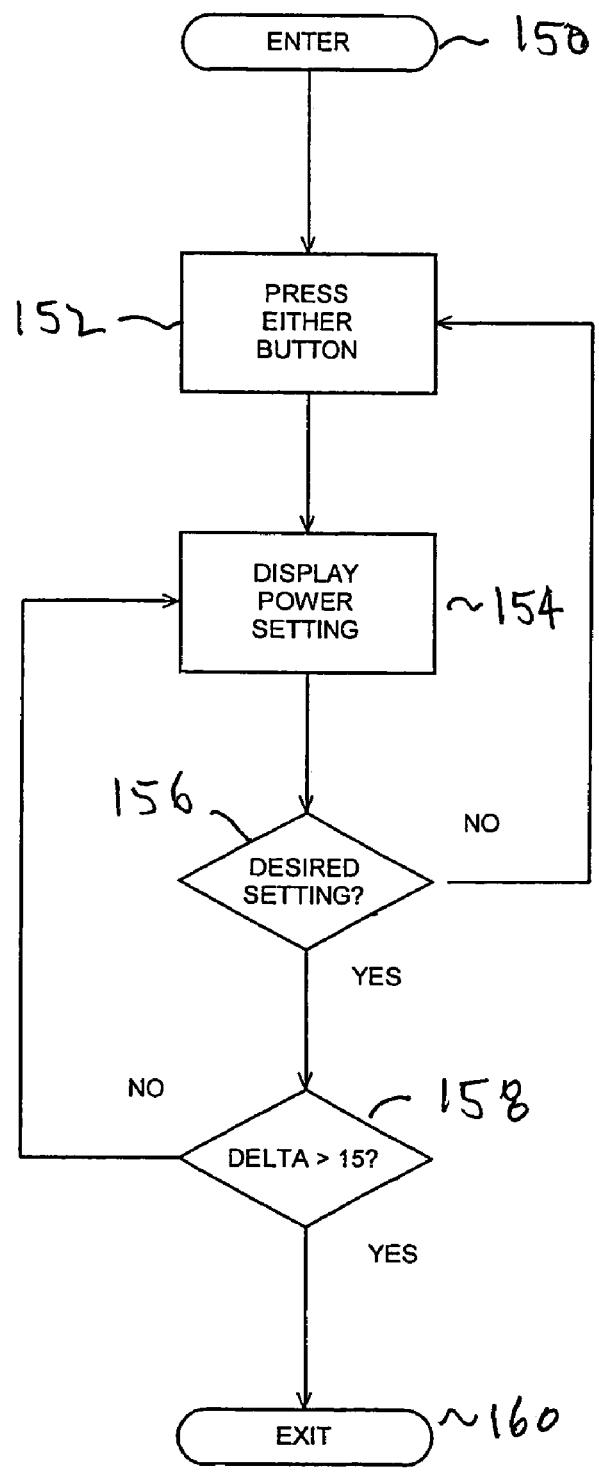
FIG. 12 is a flow chart illustrating the selection of the maximum power output level for the controller shown in FIG. 8.

As also described above, the maximum output power level is preset at 50%. However, the controller 170 includes the capability to reset the maximum power level in 5% increments up to a maximum of 100%, which is shown as "99" on the digital display 30, or down to the current minimum power level setting. A flow chart for setting the maximum power level is illustrated in FIG. 12 where blocks that are similar to blocks shown in FIG. 6 have the same numerical designators. The flow chart is entered through block 150 and proceeds to functional block 152 where the driver momentarily depresses either the minus or the plus pushbutton, 32 or 34 to cause the controller to display the current maximum power setting, as shown in functional block 154. The maximum power is the percentage of available power that is sent to the towed vehicle brakes upon completion of the voltage ramp time. The controller 11 is preset at the manufacturer with a maximum power setting of 50%, which is stored in the EEPROM 48.

The flow chart then advances to decision block 156 where the driver decides whether the maximum setting is satisfactory. If the setting is not satisfactory, the driver returns to functional block 152 and driver either presses the plus pushbutton 34 to increase the maximum power setting, or the driver presses the minus pushbutton 32 to decrease the maximum power setting. Each time one of the buttons is depressed, the maximum power setting is incrementally changed by five percent. When the selected pushbutton is pressed, the new value is immediately changed and the new setting is both displayed and stored in the EEPROM 48. If the new value is the desired value, the driver does nothing for 15 seconds. Accordingly, the flow chart advances to decision block 158 where the time period since the last pushbutton input, $\Delta T$, is compared to the time period of 15 seconds. If $\Delta T$ is less than 15 seconds, the flow chart returns to functional block 154 where the current setting is displayed and continues in the loop until either one of the pushbuttons 32 or 34 is again depressed or the time period $\Delta T$ is exceeded. Once $\Delta T$ is greater than 15 seconds, the flow chart exits through block 160. As also described above, the maximum power level setting can not be reduced below the current initial, or minimum, power level setting.

It will be appreciated the flow charts shown in FIGS. 11 and 12 are intended to exemplary and that the operation of the invention also may be practiced other than is shown in the figures.

The digital display 30 also is operative, under control of the MPU 44, to flash various symbols and numbers that are used to set up and monitor the performance of the towed vehicle brakes 13 and 14. The MPU 44 continuously monitors parameters and will display a flashing symbol upon detection of a problem with the towed vehicle, the towing vehicle or the controller itself. For the preferred embodiment, the various available symbols for the controller 170, with descriptive captions, are illustrated in FIG. 7 and described above.

Figure 13:
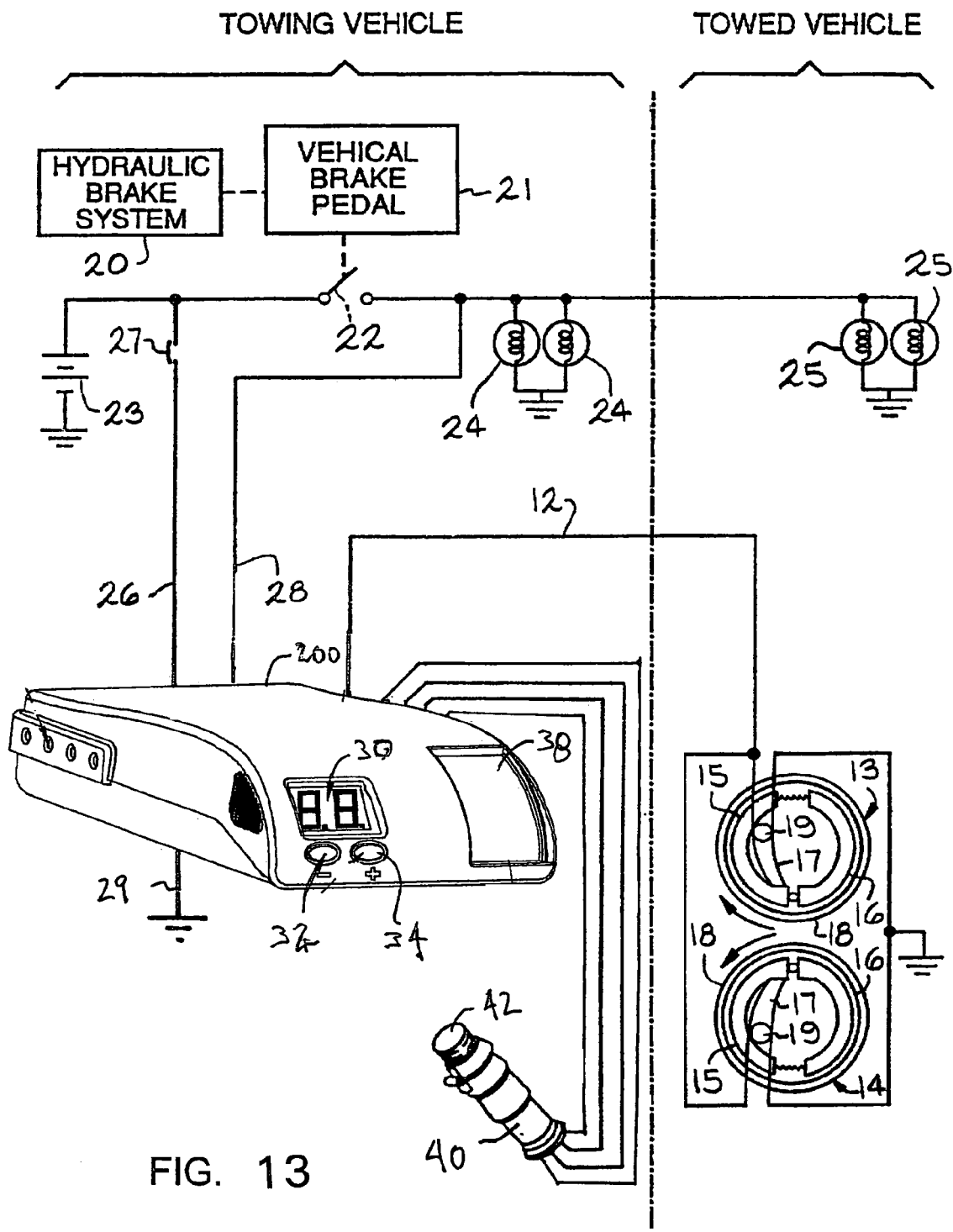
FIG. 13 is a schematic circuit drawing of another alternate embodiment of the brake controller shown in FIG. 1.
Figure 14A:
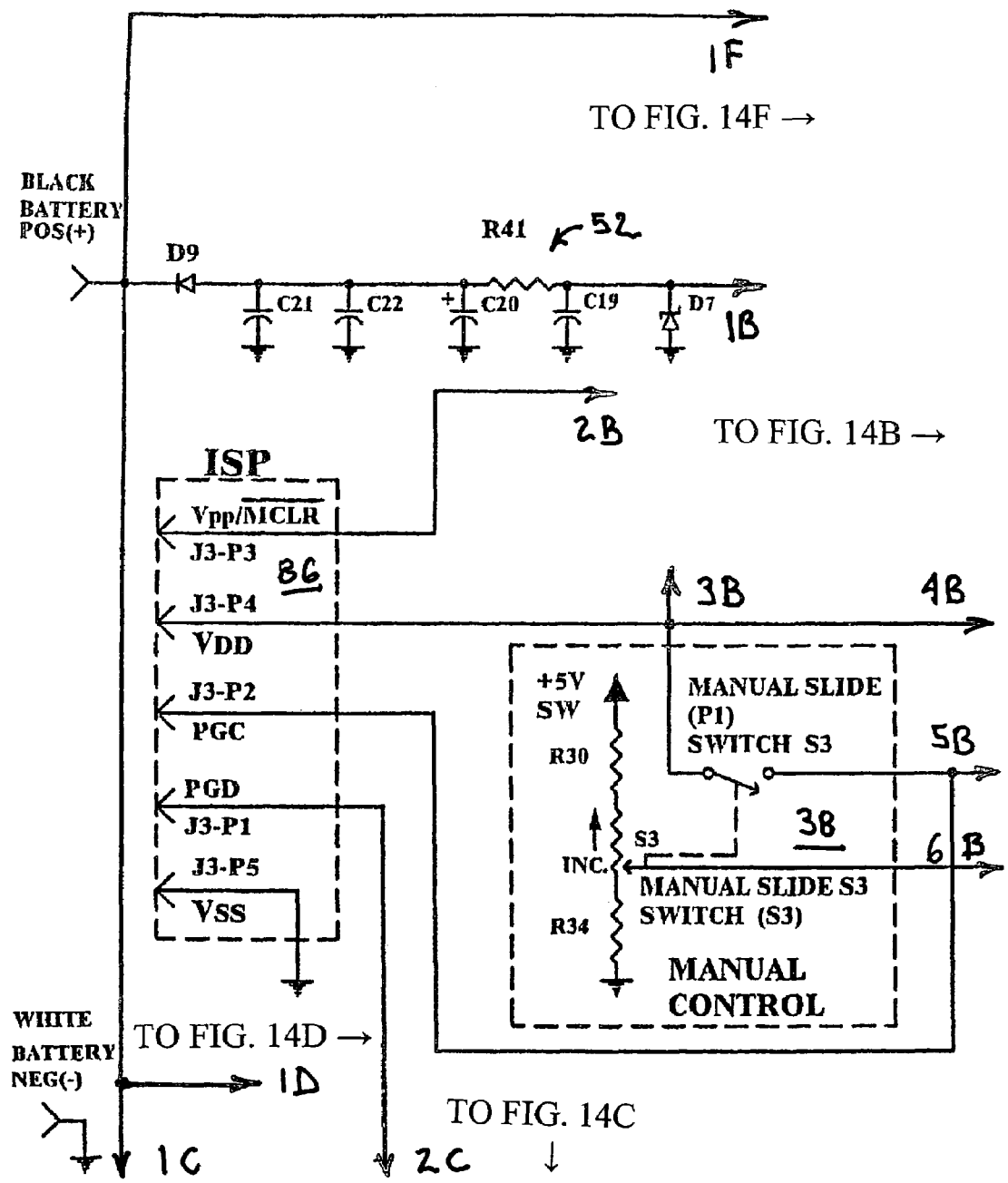
Figure 14B:
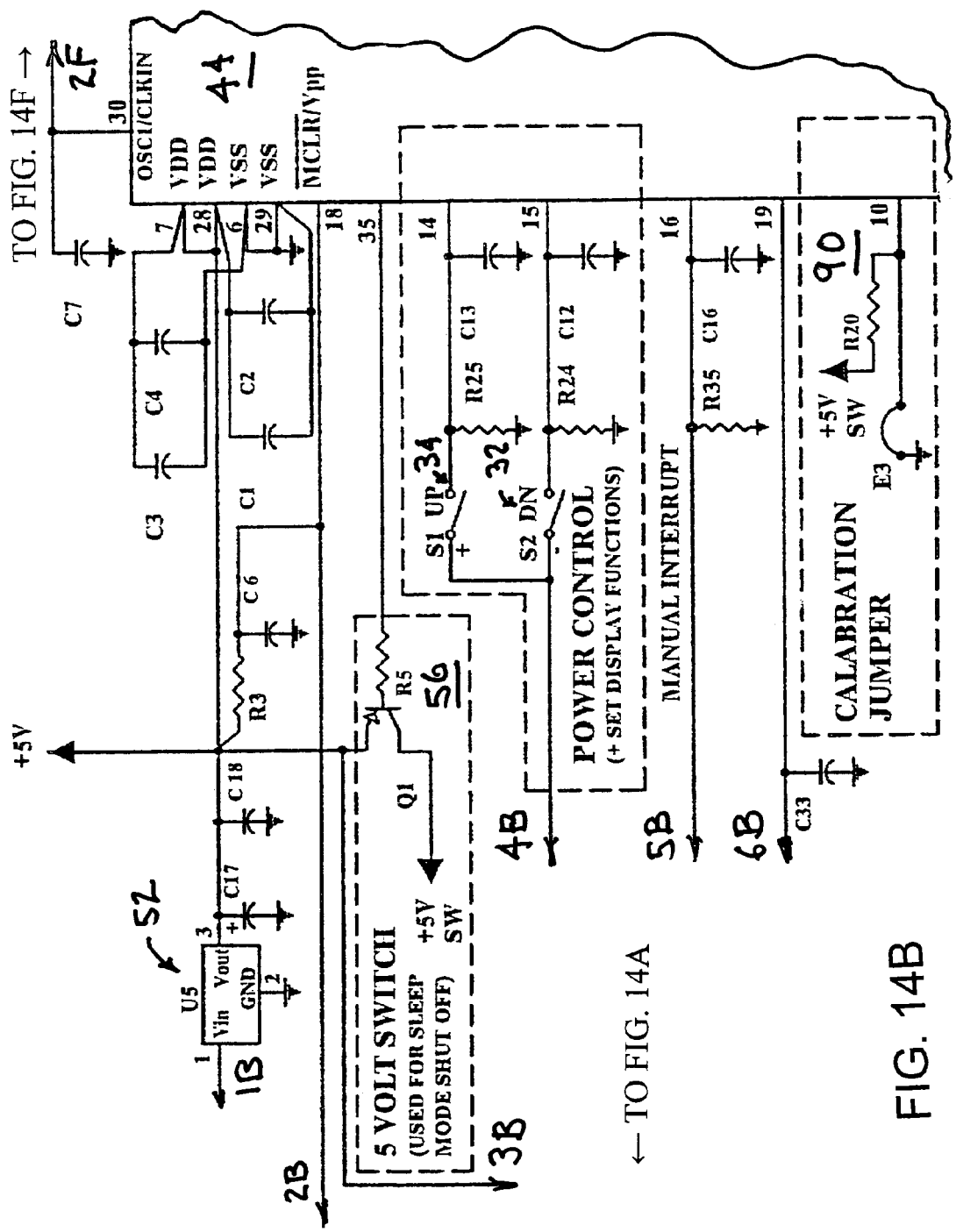
Figure 14C:
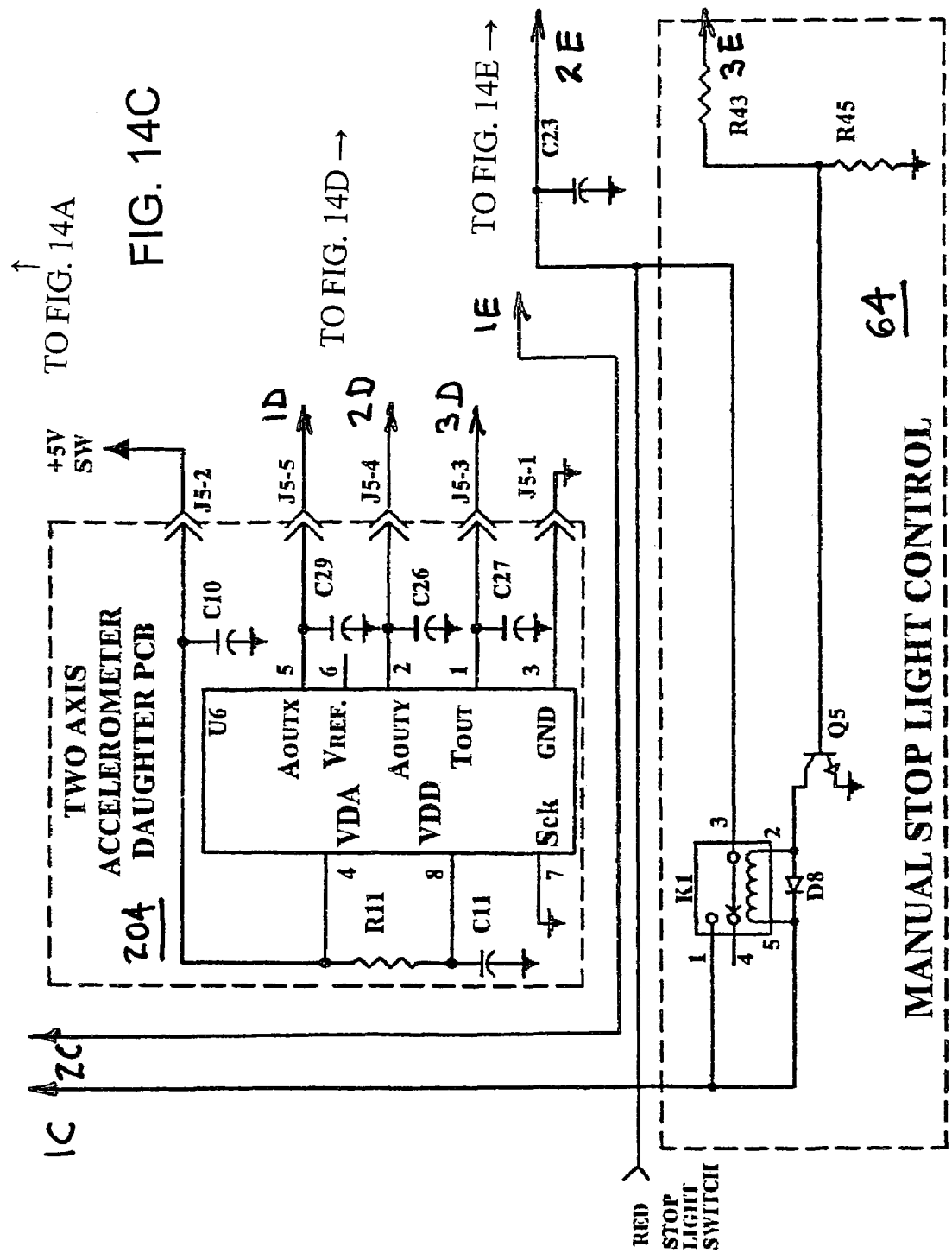
Figure 14D:
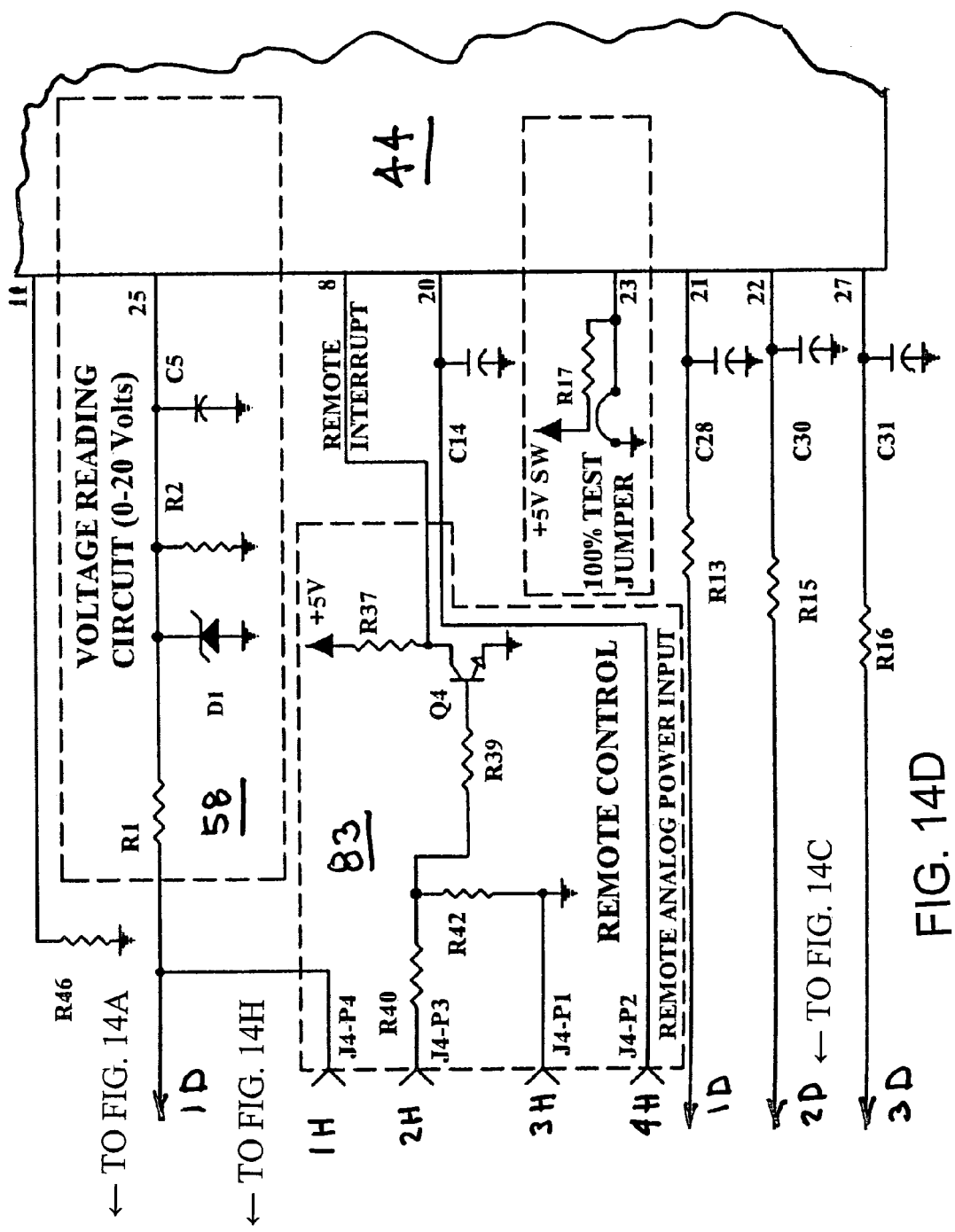
Figure 14E:
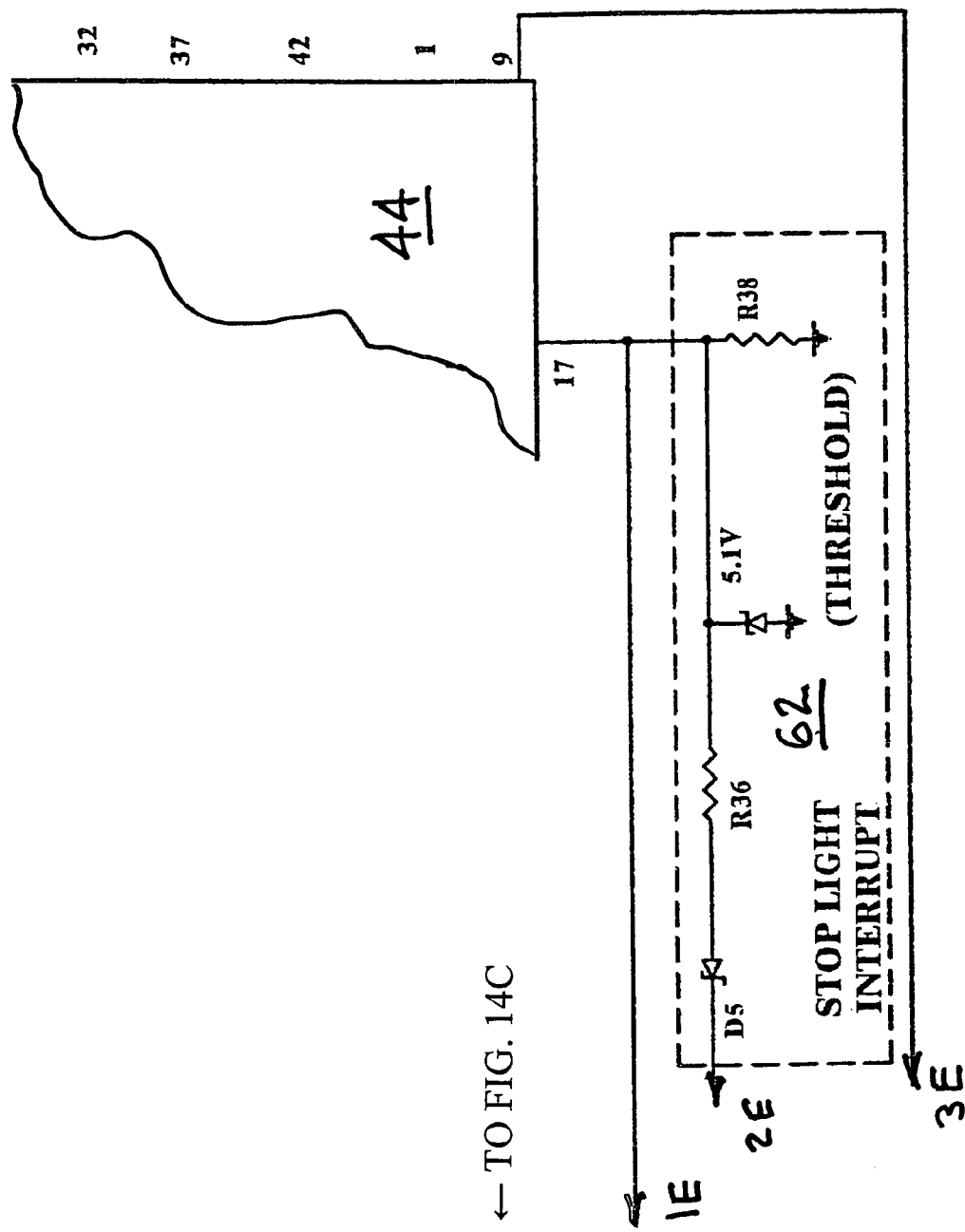
Figure 14G:
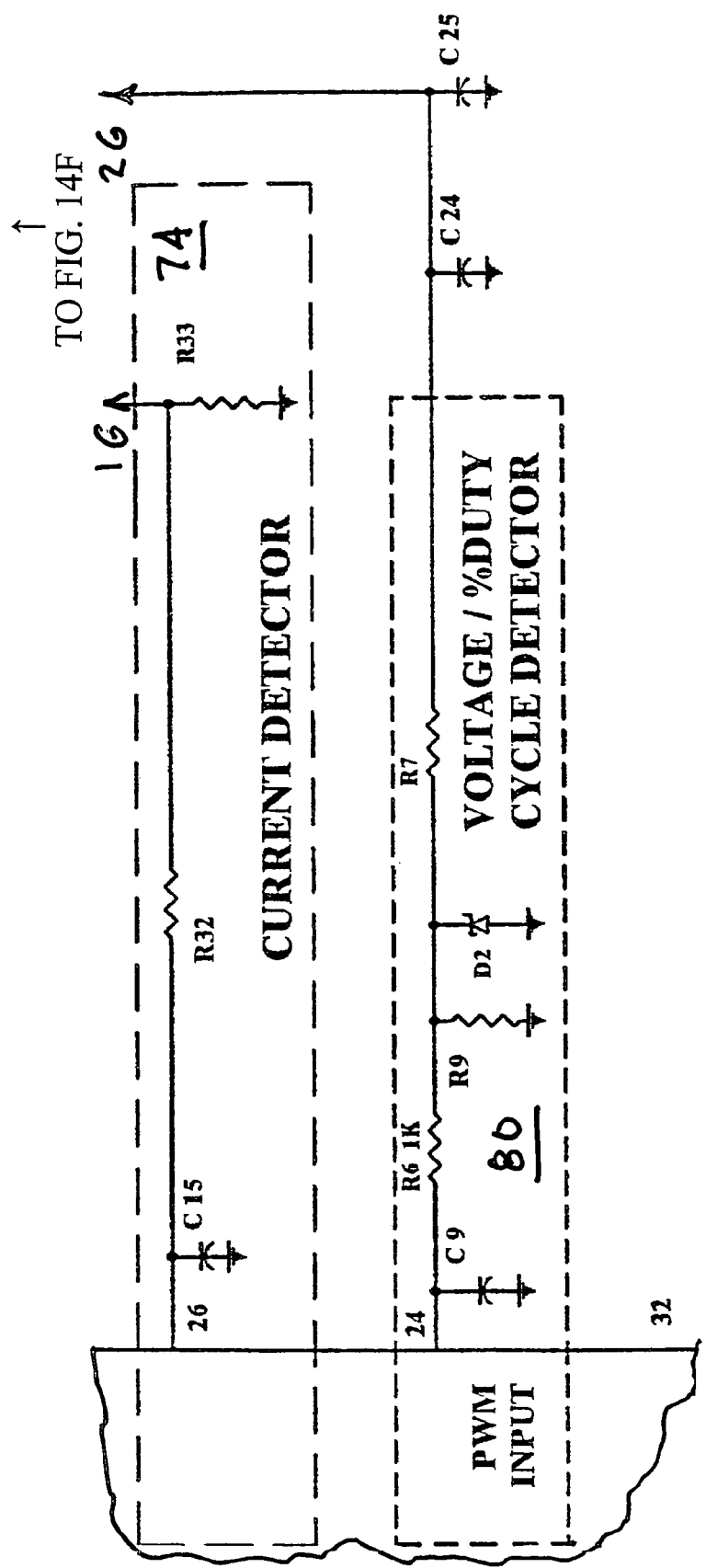

The present invention also contemplates another alternate embodiment as an electronic controller 200, as shown in FIG. 13, where components that are similar to components shown in FIG. 8 have the same numerical identifiers. The circuit diagram for the controller 200 illustrated by the circuit diagram 202 in FIGS. 14A through 14H, where components that are similar to components shown in FIGS. 9A through 9J have the same numerical identifiers. The controller circuit 202 includes a two-axis accelerometer 204 that senses the deceleration of the towing vehicle and generates a brake signal that is proportional to the deceleration. The controller 200 then generates an electric current that is proportional to the brake signal and is supplied to the trailer brake coils 19, similar to the controller 170 illustrated and described above.

The two axis accelerometer 204 allows for increased mounting angles upon the towing vehicle while also providing increased accuracy for sensing deceleration at extreme mounting angles. In the preferred embodiment, a first sensor device within the accelerometer 204 monitors longitudinal deceleration of the towing vehicle while a second sensing device monitors vertical deceleration. Thus, the controller 200 is mounted within a towing vehicle with the first sensing device generally aligned with the longitudinal axis of the towing vehicle while the second sensing device is generally aligned with the vertical axis of the towing vehicle (not shown). The sensing devices generate longitudinal and vertical deceleration signals that are proportional to the deceleration of the towing vehicle. The generated deceleration signals are sent to the MPU 44. The towing vehicle deceleration is then determined by the MPU 44 as a vector sum of the longitudinal deceleration and the vertical deceleration readings. In the preferred embodiment, the negative of the vertical deceleration is combined with the longitudinal deceleration to obtain the total deceleration. Alternately, the tangents of the two deceleration signals relative to the horizontal longitudinal towing vehicle axis may be combined to obtain the deceleration. Again, in the preferred embodiment, the negative of the tangent of the vertical deceleration is combined with the tangent of the longitudinal deceleration to obtain the total deceleration. The two axis accelerometer 204 provides superior performance over a single axis accelerometer since the output of the later sensor decreases in both magnitude and accuracy as the single sensor axis approaches the vertical. This sensitivity to mounting angle encountered with a single axis accelerometer is avoided by using the two axis accelerometer shown in FIG. 14.

Similar to the previously described controller 170, the alternate embodiment controller 200 includes a manual brake slide lever 38 and an optional remote manual brake control 40 that override the brake control signal generated by accelerometer 204 upon either of their outputs exceeding the accelerometer output. The controller 200 also includes a digital display 30 for displaying operating parameters and error codes, as described above and illustrated in FIG. 7. Furthermore, a pair of pushbuttons 32 and 34 may be selectively depressed to select minimum and maximum limits for the output power supplied to the brake coils 19, again as described above. The selected values are permanently stored in the EEPROM 48. As described above for the controller circuit 36, the controller circuit 202 also includes improved short circuit and current limit circuits. The remaining portions of the controller circuit 202 are the same and function as the same described above for the time based controller 171.

The use of the MPU 44 in the above controller circuits 36, 171 and 202 aids calibration and thus provides improved performance from the brake controllers 11, 170 and 200 perform better. The MPU 44 in each of the controllers described above can be calibrated to read the minimum input when the manual slide lever 38 is initially moved and the maximum at the end limit of the manual travel. This ensures that the output is controlled by the full travel of the slide pot. Previously known controllers could reach 100% output by the middle of the manual travel. The same feature also applies to the remote manual control 40, when the controller 200 is so equipped. The controllers 36, 170 and 200 are much more linear and have better response. Previously known controllers were not linear and could work more like a switch, which is undesirable. The use of the MPU 44 to calibrate the automatic output also makes the automatic output more linear and ensures consistently between the entire controllers.

The invention also contemplates that the MPU 44 is used for manufacturing testing of the controllers before shipment to the sale outlets. This ensures every mode of controller operation is tested correctly and the correct results are obtained. The test mode always sets the controllers to the default display mode, the default maximum power level, minimum turn-on and or output ramp time. Operators could forget to set one or more of these modes or set them an incorrect level.

As described above, all of the controllers use two push buttons to increase and decrease the maximum power level. These same buttons also may be used by the end user to set all of the changeable features of the controllers. All values set by the end user is stored in EEPROM and will not be lost if the battery is disconnected.

The principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described for operation a pair of towed vehicle brakes, it will be appreciated that invention also may be practiced to control more than two such brakes. The invention contemplates that the controllers 11 and 170 may be used to control two to eight towed vehicle brakes, although more than eight also may be controlled.

What is claimed is:

1. A trailer brake controller comprising:
   a pendulum device for generating a brake control signal that is a function of the deceleration of a towing vehicle;
   a microprocessor that includes an internal Read Only Memory (ROM) that stores coding for an algorithm that controls operation of the brake controller, said microprocessor connected to said pendulum device and responsive to said brake control signal to generate an output brake actuation signal at a brake signal output pin, said output brake actuation signal varying in proportion to said brake control signal between a minimum value and a maximum value;

a pair of pushbuttons connected to said microprocessor, said pushbuttons being selectively operative to change said minimum and maximum values of said output brake actuation signal that is generated by said microprocessor;

an Electrically Erasable Programmable Read Only Memory (EEPROM) connected to said microprocessor, said EEPROM receiving and storing said selected minimum and maximum values; and a programmable current sensing power switch with temperature protection which is adapted to be connected between a power supply and a set of trailer brake coils, said power switch connected to said brake signal output pin of said microprocessor and responsive to said brake control signal to supply a current that is a function of said brake control signal to said trailer brake coils, said power switch also connected by a feedback resistor to a current feedback port on said microprocessor, said power switch cooperating with said current feedback resistor to supply a current feedback signal to said microprocessor, said current feedback signal being a function of said current being supplied to said trailer brake coils, said microprocessor being operative to monitor said current feed back signal and also being responsive to said current feedback signal exceeding a predetermined current shut down threshold to cause said power switch to change to a non-conducting state for a predetermined period of time, said power switch also being operative to change directly to a non-conducting state upon the temperature of said switch exceeding a temperature shut down threshold and to remain in said non-conducting state for a predetermined period of time.

2. The trailer brake controller according to claim 1 further including a visual display, said microprocessor being operative to monitor parameters within the controller and, upon detection of a problem, to illuminate said display to inform an operator of the towing vehicle of the problem.

3. The trailer brake controller according to claim 2 wherein said microprocessor is further operative to monitor output parameters of the controller and further wherein selective manipulation of said pushbuttons will display a selected parameter upon said display to said operator of the towing vehicle.

4. A trailer brake controller comprising:

a brake control signal generator for generating a brake control signal that is proportional to the deceleration of a towing vehicle;

a microprocessor connected to said brake control signal generator and responsive to said brake control signal to generate an output brake actuation signal at a brake signal output pin, said output brake actuation signal varying in proportion to said brake control signal between a minimum value and a maximum value;

at least one pushbutton connected to said microprocessor, said at least one pushbutton being operative to change said minimum and maximum values of said output brake actuation signal that is generated by said microprocessor; and a programmable current sensing power switch with temperature protection which is adapted to be connected between a power supply and a set of trailer brake coils, said power switch connected to said brake signal output pin of said microprocessor and responsive to said brake control signal to supply current to said trailer brake coils that is a function of said brake control signal, said power switch also connected by a feedback resistor to a current feedback port on said microprocessor, said power switch cooperating with said current feedback resistor to supply a current feedback signal to said microprocessor that is a function of said current being supplied to said trailer brake coils, said microprocessor being operative to monitor said current feed back signal and also being responsive to said current feedback signal exceeding a predetermined current shut down threshold to cause said power switch to change to a non-conducting state for a predetermined period of time, said power switch also being operative to change directly to a non-conducting state upon the temperature of said switch exceeding a temperature shut down threshold and to remain in said non-conducting state for a predetermined period of time.

5. The trailer brake controller according to claim 4 wherein said brake control signal generator is a pendulum device that generates said brake control signal that is a function of the deceleration of said towing vehicle.

6. The trailer brake controller according to claim 5 wherein said at least one pushbutton includes a pair of pushbuttons that are selectively operative to select minimum and maximum brake output power limits.

7. The trailer brake controller according to claim 6 further including an Electrically Erasable Programmable Read Only Memory (EEPROM) connected to said microprocessor, said EEPROM receiving and storing said selected minimum and maximum brake output power limits.

8. The trailer brake controller according to claim 7 wherein said microprocessor includes an internal Read Only Memory (ROM) that stores coding for an algorithm that controls the operation of the brake controller.

* * * * *